(12) United States Patent
Huang et al.

(10) Patent No.: US 12,510,732 B2
(45) Date of Patent: Dec. 30, 2025

(54) OPTICAL LENS ASSEMBLY AND PHOTOGRAPHING MODULE

(71) Applicant: NEWMAX TECHNOLOGY CO., LTD., Taichung (TW)

(72) Inventors: Ching-Yun Huang, Taichung (TW); Chun-Sheng Lee, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 302 days.

(21) Appl. No.: 18/368,015

(22) Filed: Sep. 14, 2023

(65) Prior Publication Data

US 2025/0013009 A1    Jan. 9, 2025

(30) Foreign Application Priority Data

Jul. 4, 2023    (TW) ................................. 112124915

(51) Int. Cl.
  *G02B 9/62*    (2006.01)
  *G02B 13/00*    (2006.01)
  *G02B 13/06*    (2006.01)

(52) U.S. Cl.
  CPC ........... *G02B 9/62* (2013.01); *G02B 13/0045* (2013.01); *G02B 13/06* (2013.01)

(58) Field of Classification Search
  None
  See application file for complete search history.

(56) References Cited

U.S. PATENT DOCUMENTS

| | | | | |
|---|---|---|---|---|
| 5,255,121 A | * | 10/1993 | Suzuki | G02B 25/001 |
| | | | | 359/761 |
| 6,353,509 B1 | * | 3/2002 | Nakazawa | G02B 13/04 |
| | | | | 359/756 |
| 2012/0057249 A1 | * | 3/2012 | Yamamoto | G02B 13/04 |
| | | | | 359/713 |
| 2017/0351068 A1 | * | 12/2017 | Tseng | G02B 13/16 |
| 2019/0302418 A1 | * | 10/2019 | Liao | G02B 13/0045 |

* cited by examiner

*Primary Examiner* — Darryl J Collins

(74) *Attorney, Agent, or Firm* — Juan Carlos A. Marquez; Marquez IP Law Office, PLLC

(57) ABSTRACT

An optical lens assembly includes a stop, and includes, in order from an object side to an image side: a first lens, a second lens, a third lens, a fourth lens, a fifth lens and a sixth lens, wherein an incident angle where a main light is incident on an image plane at a maximum view angle of the optical lens assembly is CRA, a maximum optical effective radius of the image-side surface of the sixth lens is CA62, and the following conditions are satisfied: $9.27 < CRA/CA62 < 20.02$.

20 Claims, 13 Drawing Sheets

OPTICAL LENS ASSEMBLY AND PHOTOGRAPHING MODULE

CROSS-REFERENCE TO RELATED APPLICATION

This application claims the benefit of Taiwan Patent Application No. 112124915, filed on Jul. 4, 2023, which is hereby incorporated by reference for all purposes as if fully set forth herein.

BACKGROUND

Technical Field

The present disclosure relates to an optical lens assembly and a photographing module, and in particular, to an optical lens assembly and a photographing module applicable to an electronic device.

Related Art

At present, ultra-wide-angle lens modules are widely used in various technical fields, e.g., photography, monitors, automation equipment, and systems for vehicle surround view. There are also prior arts that apply the ultra-wide-angle lens modules to Internet of Things (IOT) devices. However, these ultra-wide-angle lens modules in the prior arts usually have some limitations.

Ultra-wide-angle lens modules currently used in Internet of Things (IOT) devices often have limitations of low resolution and relatively long height of lens module, and these limitations affect performance of high-quality image output of the lens modules. In addition, since the height of the ultra-wide-angle lens module is longer, it occupies a limited space in Internet of Things (IOT) devices and limits its flexibility in design. Therefore, how to make ultra-wide-angle, high-resolution and miniaturized lens modules more flexibly adapt to various Internet of Things (IOT) devices is one of the important directions of current lens module research.

SUMMARY

An objective of the present disclosure is to resolve the above problems of the prior art. In order to achieve the above objective, the present disclosure provides an optical lens assembly comprising a stop, and in order from an object side to an image side, comprising: a first lens with negative refractive power, comprising an object-side surface and an image-side surface, wherein the image-side surface of the first lens is concave near the optical axis; a second lens with positive refractive power, comprising an object-side surface and an image-side surface, wherein the object-side surface of the second lens is convex near the optical axis, and the image-side surface of the second lens is convex near the optical axis; a third lens with negative refractive power, comprising an object-side surface and an image-side surface, wherein the image-side surface of the third lens is concave near the optical axis; a fourth lens with positive refractive power, comprising an object-side surface and an image-side surface, wherein the object-side surface of the fourth lens is convex near the optical axis, and the image-side surface of the fourth lens is concave near the optical axis; and a fifth lens with positive refractive power, comprising an object-side surface and an image-side surface, wherein the object-side surface of the fifth lens is convex near the optical axis, and the image-side surface of the fifth lens is convex near the optical axis; and a sixth lens with positive refractive power, comprising an object-side surface and an image-side surface, wherein the object-side surface of the sixth lens is convex near the optical axis, and the image-side surface of the sixth lens is concave near the optical axis.

A total quantity of lenses with refractive power in the optical lens assembly is six. An incident angle where a main light is incident on an image plane at a maximum view angle of the optical lens assembly is CRA, a maximum optical effective radius of the image-side surface of the sixth lens is CA62, and the following conditions are satisfied: $9.27 < CRA/CA62 < 20.02$.

When the optical lens assembly satisfies the conditions of $9.27 < CRA/CA62 < 20.02$, the incident angle of the image sensor can be satisfied and the miniaturization of the optical lens assembly can be achieved by more appropriate configuration.

A displacement parallel to the optical axis from an intersection point of the image-side surface of the first lens on the optical axis to a position of the maximum effective radius of the image-side surface of the first lens is TDP2, a half of a maximum field of view of the optical lens assembly is HFOV, an f-number of the optical lens assembly is Fno, and the following conditions are satisfied: $12.19 \text{ (mm*degree)} < TDP2*HFOV/Fno < 41.70 \text{ (mm*degree)}$. In this way, the optical lens assembly has an ultra wide angle and a large amount of incident light, and the formability of the optical lens assembly can be optimally balanced to be easily manufactured.

A focal length of the optical lens assembly is f, a curvature radius of an image-side surface of the fifth lens is R10, and the following condition is satisfied: $-1.6 < f/R10 < -0.6$. In this way, the refractive power and curvature radius of lenses of the optical lens assembly can be optimally balanced to be easily manufactured.

A focal length of the third lens is f3, a focal length of the fifth lens is f5, and the following condition is satisfied: $-4.01 < f3/f5 < -1.09$. In this way, the configuration of the lens refractive power of the optical lens assembly is more appropriate, it is beneficial to correct the system aberration and improve the image quality of the optical lens assembly.

A distance from the object-side surface of the first lens to the image plane along the optical axis is TL, a maximum image height of the optical lens assembly is INM, and the following condition is satisfied: $1.95 < TL/IMH < 3.32$. In this way, the ratio of a lens height to an image size is more appropriate, and it is beneficial to balance the image quality and the size of the optical lens assembly.

A focal length of the second lens is f2, a focal length of the fifth lens is f5, a central thickness of the second lens along the optical axis is CT2, a central thickness of the fifth lens along the optical axis is CT5, and the following condition is satisfied: $-3.13 < (f2/CT2)-(f5/CT5) < 0.5$. In this way, the proper distribution of the lens refractive power and thickness of the optical lens assembly can take into account the performance and lens formability of the optical lens assembly.

An incident angle where a main light is incident on an image plane at a maximum view angle of the optical lens assembly is CRA, a distance from the object-side surface of the first lens to the image plane along the optical axis is TL, a distance from the image-side surface of the sixth lens to the image plane along the optical axis is BFL, and the following conditions are satisfied: $3.35 \text{ (degree/mm)} < CRA/(TL-BFL)$ <7.03 (degree/mm). In this way, an appropriate incident angle of the image sensor and back focal space can be provided.

A half of a maximum field of view of the optical lens assembly is HFOV, a maximum optical effective radius of the object-side surface of the first lens is CA11, a maximum image height of the optical lens assembly is IMH, and the following conditions are satisfied: 31.70 (degree)<HFOV* (CA11/IMH)<83.70 (degree). In this way, the configuration of the optical lens assembly is more appropriate, thereby achieving a miniaturized optical lens assembly and satisfying the effect of an ultra-wide angle.

An entrance pupil diameter of the optical lens assembly is EPD, a maximum optical effective radius of the object-side surface of the first lens is CA11, a maximum optical effective radius of the image-side surface of the second lens is CA22, and the following conditions are satisfied: 1.12 (mm)<EPD*CA11/CA22<3.12 (mm). In this way, the first lens and the second lens can achieve a better ratio of surface size, and is helpful to realize the requirement of a large opticalaperture.

A maximum optical effective radius of the object-side surface of the first lens is CA11, a central thickness of the first lens along the optical axis is CT1, a displacement parallel to the optical axis from an intersection point of the image-side surface of the first lens on the optical axis to a position of the maximum effective radius of the image-side surface of the first lens is TDP2, and the following conditions are satisfied: 3.49 (mm$^{-1}$)<CA11/(CT1*TDP2)<8.87 (mm$^{-1}$). In this way, the first lens has better formability to facilitate manufacturing.

A curvature radius of the object-side surface of the sixth lens is R11, a maximum optical effective radius of the image-side surface of the sixth lens is CA62, a central thickness of the sixth lens along the optical axis is CT6, and the following conditions are satisfied: 6.27 (mm) <R11*CA62/CT6<28.92 (mm). In this way, the sixth lens has better formability to facilitate manufacturing.

A distance from the object-side surface of the first lens to the image plane along the optical axis is TL, a distance between the position of the maximum optical effective radius of the image-side surface of the first lens and the stop along the optical axis is ET1S, and the following conditions are satisfied: 4.82<TL/ET1S<13.40. In this way, the space allocation of the first lens in the optical lens assembl is more appropriate and facilitates its assembly.

A focal length of the optical lens assembly is f, a distance between the stop and the image plane along the optical axis is CTSI, a maximum image height of the optical lens assembly is IMH, and the following conditions are satisfied: 1.82 (mm)<f*CTSI/IMH<6.13 (mm). In this way, the overall focal length and spatial configuration of the optical lens assembly achieve an optimal ratio, which is helpful to reduce the height of the optical lens assembly.

A curvature radius of the image-side surface of the second lens is R4, a central thickness of the second lens along the optical axis is CT2, and the following conditions are satisfied: −3.79<R4/CT2<−1.16. In this way, the appropriate configuration of lens thickness and curvature radius is helpful to reduce the sensitivity of the second lens, reduce assembly tolerance, and improve the quality of the optical lens assembly.

A distance from the object-side surface of the first lens to the image plane along the optical axis is TL, a focal length of the optical lens assembly is f, and the following conditions are satisfied: 2.21<TL/f<6.23. In this way, the proper distribution of the overall focal length and height of the optical lens assembly is helpful to improve the image quality of the optical lens assembly.

In addition, the present disclosure further provides a photographing module. The photographing module comprises: a lens barrel; an optical lens assembly disposed in the lens barrel; and an image sensor disposed on an image plane of the optical lens assembly.

The optical lens assembly comprising a stop, and in order from an object side to an image side, comprising: a first lens with negative refractive power, comprising an object-side surface and an image-side surface, wherein the image-side surface of the first lens is concave near the optical axis; a second lens with positive refractive power, comprising an object-side surface and an image-side surface, wherein the object-side surface of the second lens is convex near the optical axis, and the image-side surface of the second lens is convex near the optical axis; a third lens with negative refractive power, comprising an object-side surface and an image-side surface, wherein the image-side surface of the third lens is concave near the optical axis; a fourth lens with positive refractive power, comprising an object-side surface and an image-side surface, wherein the object-side surface of the fourth lens is convex near the optical axis, and the image-side surface of the fourth lens is concave near the optical axis; and a fifth lens with positive refractive power, comprising an object-side surface and an image-side surface, wherein the object-side surface of the fifth lens is convex near the optical axis, and the image-side surface of the fifth lens is convex near the optical axis; and a sixth lens with positive refractive power, comprising an object-side surface and an image-side surface, wherein the object-side surface of the sixth lens is convex near the optical axis, and the image-side surface of the sixth lens is concave near the optical axis.

A total quantity of lenses with refractive power in the optical lens assembly is six. An incident angle where a main light is incident on an image plane at a maximum view angle of the optical lens assembly is CRA, a maximum optical effective radius of the image-side surface of the sixth lens is CA62, and the following conditions are satisfied: 9.27<CRA/CA62<20.02.

When the optical lens assembly satisfies the conditions of 9.27<CRA/CA62<20.02, the incident angle of the image sensor can be satisfied and the miniaturization of the optical lens assembly can be achieved by more appropriate configuration.

A displacement parallel to the optical axis from an intersection point of the image-side surface of the first lens on the optical axis to a position of the maximum effective radius of the image-side surface of the first lens is TDP2, a half of a maximum field of view of the optical lens assembly is HFOV, an f-number of the optical lens assembly is Fno, and the following conditions are satisfied: 12.19 (mm*degree) <TDP2*HFOV/Fno<41.70 (mm*degree). In this way, the optical lens assembly has an ultra wide angle and a large amount of incident light, and the formability of the optical lens assembly can be optimally balanced to be easily manufactured.

A focal length of the optical lens assembly is f, a curvature radius of an image-side surface of the fifth lens is R10, and the following condition is satisfied: −1.6<f/R10<−0.6. In this way, the refractive power and curvature radius of lenses of the optical lens assembly can be optimally balanced to be easily manufactured.

A focal length of the third lens is f3, a focal length of the fifth lens is f5, and the following condition is satisfied:

−4.01<f3/f5<−1.09. In this way, the configuration of the lens refractive power of the optical lens assembly is more appropriate, it is beneficial to correct the system aberration and improve the image quality of the optical lens assembly.

A distance from the object-side surface of the first lens to the image plane along the optical axis is TL, a maximum image height of the optical lens assembly is INM, and the following condition is satisfied: 1.95<TL/IMH<3.32. In this way, the ratio of a lens height to an image size is more appropriate, and it is beneficial to balance the image quality and the size of the optical lens assembly.

A focal length of the second lens is f2, a focal length of the fifth lens is f5, a central thickness of the second lens along the optical axis is CT2, a central thickness of the fifth lens along the optical axis is CT5, and the following condition is satisfied: −3.13<(f2/CT2)−(f5/CT5)<0.5. In this way, the proper distribution of the lens refractive power and thickness of the optical lens assembly can take into account the performance and lens formability of the optical lens assembly.

An incident angle where a main light is incident on an image plane at a maximum view angle of the optical lens assembly is CRA, a distance from the object-side surface of the first lens to the image plane along the optical axis is TL, a distance from the image-side surface of the sixth lens to the image plane along the optical axis is BFL, and the following conditions are satisfied: 3.35 (degree/mm)<CRA/(TL−BFL) <7.03 (degree/mm). In this way, an appropriate incident angle of the image sensor and back focal space can be provided.

A half of a maximum field of view of the optical lens assembly is HFOV, a maximum optical effective radius of the object-side surface of the first lens is CA11, a maximum image height of the optical lens assembly is IMH, and the following conditions are satisfied: 31.70 (degree)<HFOV* (CA11/INM)<83.70 (degree). In this way, the configuration of the optical lens assembly is more appropriate, thereby achieving a miniaturized optical lens assembly and satisfying the effect of an ultra-wide angle.

An entrance pupil diameter of the optical lens assembly is EPD, a maximum optical effective radius of the object-side surface of the first lens is CA11, a maximum optical effective radius of the image-side surface of the second lens is CA22, and the following conditions are satisfied: 1.12 (mm)<EPD*CA11/CA22<3.12 (mm). In this way, the first lens and the second lens can achieve a better ratio of surface size, and is helpful to realize the requirement of a large opticalaperture.

A maximum optical effective radius of the object-side surface of the first lens is CA11, a central thickness of the first lens along the optical axis is CT1, a displacement parallel to the optical axis from an intersection point of the image-side surface of the first lens on the optical axis to a position of the maximum effective radius of the image-side surface of the first lens is TDP2, and the following conditions are satisfied: 3.49 (mm$^{-1}$)<CA11/(CT1*TDP2)<8.87 (mm$^{-1}$). In this way, the first lens has better formability to facilitate manufacturing.

A curvature radius of the object-side surface of the sixth lens is R11, a maximum optical effective radius of the image-side surface of the sixth lens is CA62, a central thickness of the sixth lens along the optical axis is CT6, and the following conditions are satisfied: 6.27 (mm) <R11*CA62/CT6<28.92 (mm). In this way, the sixth lens has better formability to facilitate manufacturing.

A distance from the object-side surface of the first lens to the image plane along the optical axis is TL, a distance between the position of the maximum optical effective radius of the image-side surface of the first lens and the stop along the optical axis is ET1S, and the following conditions are satisfied: 4.82<TL/ET1S<13.40. In this way, the space allocation of the first lens in the optical lens assembl is more appropriate and facilitates its assembly.

A focal length of the optical lens assembly is f, a distance between the stop and the image plane along the optical axis is CTSI, a maximum image height of the optical lens assembly is IMH, and the following conditions are satisfied: 1.82 (mm)<f*CTSI/IMH<6.13 (mm). In this way, the overall focal length and spatial configuration of the optical lens assembly achieve an optimal ratio, which is helpful to reduce the height of the optical lens assembly.

A curvature radius of the image-side surface of the second lens is R4, a central thickness of the second lens along the optical axis is CT2, and the following conditions are satisfied: −3.79<R4/CT2<−1.16. In this way, the appropriate configuration of lens thickness and curvature radius is helpful to reduce the sensitivity of the second lens, reduce assembly tolerance, and improve the quality of the optical lens assembly.

A distance from the object-side surface of the first lens to the image plane along the optical axis is TL, a focal length of the optical lens assembly is f, and the following conditions are satisfied: 2.21<TL/f<6.23. In this way, the proper distribution of the overall focal length and height of the optical lens assembly is helpful to improve the image quality of the optical lens assembly.

DETAILED DESCRIPTION

In order to enable a person of ordinary skill in the art to understand and realize the contents of the present disclosure, the following are illustrated by proper embodiments with accompanying drawings, and the equivalent substitutions and modifications based on the contents of the present disclosure are included in the scope of the present disclosure. It is also stated that the accompanying drawings of the present disclosure are not depictions of actual dimensions, and although the present disclosure provides embodiments of particular parameters, it is to be understood that the parameters need not be exactly equal to their corresponding values, and that, within an acceptable margin of error, are approximate to their corresponding parameters. The following embodiments will further detail the technical aspects of the present disclosure, but the disclosure is not intended to limit the scope of the present disclosure.

First Embodiment

Figure 1A:
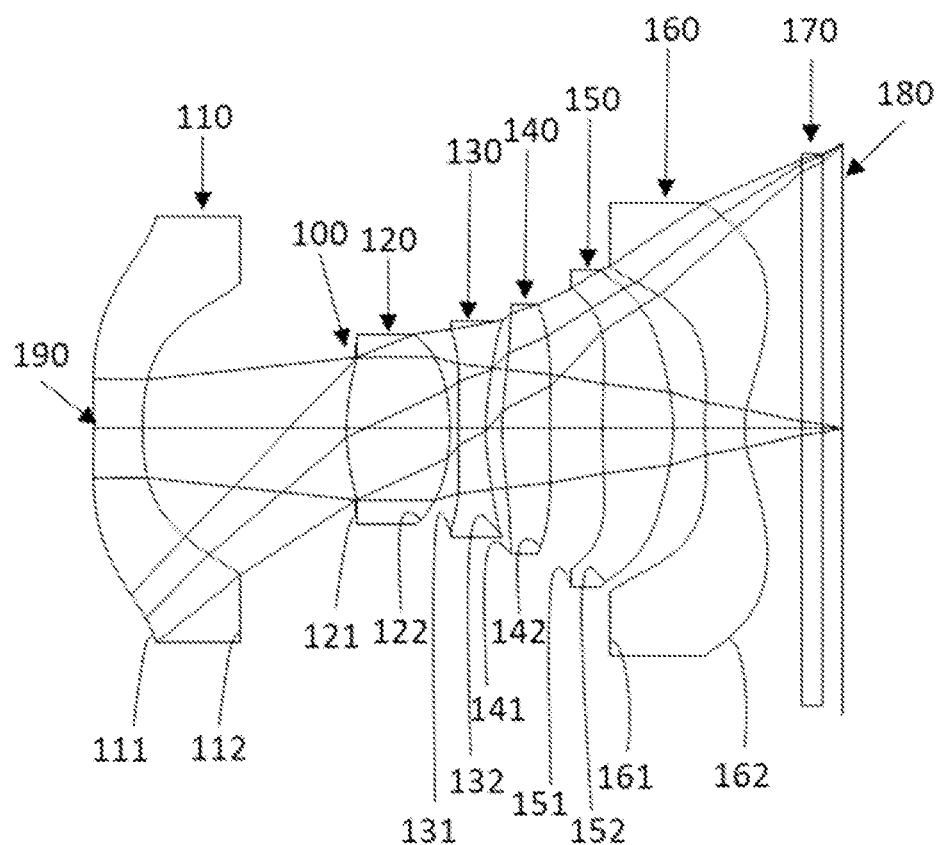
FIG. 1A is a schematic view of an optical lens assembly according to a first embodiment of the present disclosure.
Figure 1B:
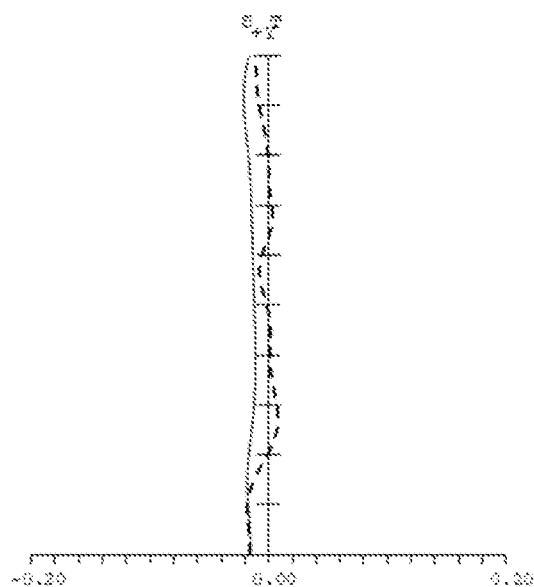
FIG. 1B sequentially shows a field curvature curve and a distortion curve of an optical lens assembly according to a first embodiment.
Figure 1B:
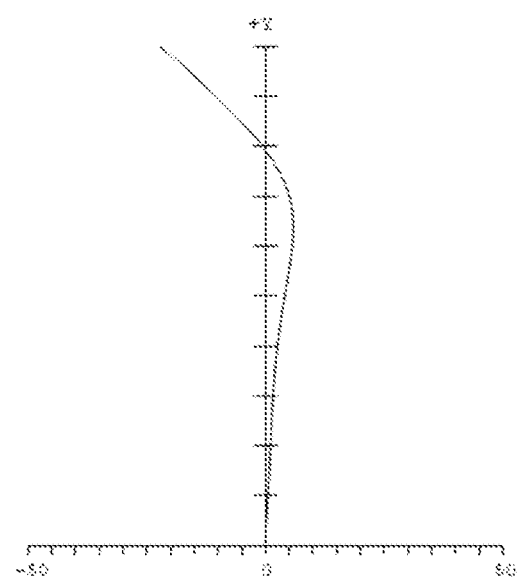

Refer to FIG. 1A and FIG. 1B. FIG. 1A is a schematic view of an optical lens assembly according to a first embodiment of the present disclosure, and FIG. 1B shows a field curvature curve and a distortion curve of an optical lens assembly according to a first embodiment. As can be seen from FIG. 1A, the optical lens assembly includes, in order from an object side to an image side: a stop 100, a first lens 110, a second lens 120, a third lens 130, a fourth lens 140, a fifth lens 150, a sixth lens 160, an IR-cut filter 170, and an image plane 180. A total quantity of lenses with refractive power in the optical lens assembly is six.

The first lens 110 with negative refractive power is made of a plastic material and includes an object-side surface 111 and an image-side surface 112, wherein the object-side surface 111 of the first lens 110 is concave near an optical axis 190, and the image-side surface 112 of the first lens 110 is concave near the optical axis 190. The object-side surface 111 and the image-side surface 112 are aspheric.

The second lens 120 with positive refractive power is made of a plastic material and includes an object-side surface 121 and an image-side surface 122, wherein the object-side surface 121 of the second lens 120 is convex near the optical axis 190, and the image-side surface 122 of the second lens 120 is convex near the optical axis 190. The object-side surface 121 and the image-side surface 122 are aspheric.

The third lens 130 with negative refractive power is made of a plastic material and includes an object-side surface 131 and an image-side surface 132, wherein the object-side surface 131 of the third lens 130 is convex near an optical axis 190, and the image-side surface 132 of the third lens 130 is concave near the optical axis 190. The object-side surface 131 and the image-side surface 132 are aspheric.

The fourth lens 140 with positive refractive power is made of a plastic material and includes an object-side surface 141 and an image-side surface 142, wherein the object-side surface 141 of the fourth lens 140 is convex near an optical axis 190, and the image-side surface 142 of the fourth lens 140 is concave near the optical axis 190. The object-side surface 141 and the image-side surface 142 are aspheric.

The fifth lens 150 with positive refractive power is made of a plastic material and includes an object-side surface 151 and an image-side surface 152, wherein the object-side surface 151 of the fifth lens 150 is convex near the optical axis 190, and the image-side surface 152 of the fifth lens 150 is convex near the optical axis 190. The object-side surface 151 and the image-side surface 152 are aspheric.

The sixth lens 160 with negative refractive power is made of a plastic material and includes an object-side surface 161 and an image-side surface 162, wherein the object-side surface 161 of the sixth lens 160 is convex near the optical axis 190, and the image-side surface 162 of the sixth lens 160 is concave near the optical axis 190. The object-side surface 161 and the image-side surface 162 are aspheric.

The IR-cut filter 170 is made of glass, and is disposed between the sixth lens 160 and the image plane 180 without affecting a focal length of the optical lens assembly. It can be understood that, the IR-cut filter 170 may also be formed on the surface of the above-mentioned lens. The IR-cut filter 170 may also be made of other materials.

An aspheric curve equation of the above-mentioned lenses is expressed as follows:

$$z(h) = \frac{ch^2}{1 + \left[1 - (k+1)c^2h^2\right]^{0.5}} + \sum (A_i) \cdot \left(h^i\right)$$

wherein, z is a position value in the direction of the optical axis 190 and with a surface vertex as a reference at a position of a height h; c is a curvature of a lens surface near the optical axis 190, and is a reciprocal of a curvature radius (R) (c=1/R), R is a curvature radius of a lens surface near the optical axis 190, h is a vertical distance between the lens surface and the optical axis 190, k is a conic constant, and Ai is an $i^{th}$ order aspheric coefficient.

In the first embodiment, a focal length of the optical lens assembly is f, an f-number of the optical lens assembly is Fno, and a maximum field of view in the optical lens assembly is FOV, and values are as follows: f=2.50 (millimeters), Fno=2.27, and FOV=116.63 (degrees).

In the optical lens assembly of the first embodiment, an incident angle where a main light is incident on an image plane at a maximum view angle of the optical lens assembly is CRA, a maximum optical effective radius of the image-side surface 162 of the sixth lens 160 is CA62, and the following conditions are satisfied: CRA/CA62=13.57.

In the optical lens assembly of the first embodiment, a displacement parallel to the optical axis from an intersection point of the image-side surface of the first lens on the optical axis to a position of the maximum effective radius of the image-side surface 112 of the first lens 110 is TDP2, a half of a maximum field of view of the optical lens assembly is HFOV, an f-number of the optical lens assembly is Fno, and the following conditions are satisfied: TDP2*HFOV/Fno=26.08 (mm*degree).

In the optical lens assembly of the first embodiment, a focal length of the optical lens assembly is f, a curvature radius of an image-side surface 152 of the fifth lens 150 is R10, and the following condition is satisfied: f/R10=−1.05.

In the optical lens assembly of the first embodiment, a focal length of the third lens 130 is f3, a focal length of the fifth lens 150 is f5, and the following condition is satisfied: f3/f5=−1.63.

In the optical lens assembly of the first embodiment, a distance from the object-side surface 111 of the first lens 110 to the image plane along the optical axis is TL, a maximum image height of the optical lens assembly is INM, and the following condition is satisfied: TL/IMH=2.44.

In the optical lens assembly of the first embodiment, a focal length of the second lens 120 is f2, a focal length of the fifth lens 150 is f5, a central thickness of the second lens 120 along the optical axis 190 is CT2, a central thickness of the fifth lens 150 along the optical axis 190 is CT5, and the following condition is satisfied: (f2/CT2)−(f5/CT5)=−2.61.

In the optical lens assembly of the first embodiment, a distance from the object-side surface 111 of the first lens 110 to an image plane 180 along the optical axis 190 is TL, a maximum image height of the optical lens assembly is IMH, and the following conditions are satisfied: TL/IMH=3.90.

In the optical lens assembly of the first embodiment, an incident angle where a main light is incident on an image plane 180 at a maximum view angle of the optical lens assembly is CRA, a distance from the object-side surface 111 of the first lens 110 to the image plane 180 along the optical axis 190 is TL, a distance from the image-side surface 162 of the sixth lens 160 to the image plane 180 along the optical axis 190 is BFL, and the following conditions are satisfied: CRA/(TL−BFL)=5.07 (degree/mm).

In the optical lens assembly of the first embodiment, a half of a maximum field of view of the optical lens assembly is HFOV, a maximum optical effective radius of the object-side surface 111 of the first lens 110 is CA11, a maximum image height of the optical lens assembly is IMH, and the following conditions are satisfied: HFOV*(CA11/IMH)=43.55 (degree).

In the optical lens assembly of the first embodiment, an entrance pupil diameter of the optical lens assembly is EPD, a maximum optical effective radius of the object-side surface 111 of the first lens 110 is CA11, a maximum optical effective radius of the image-side surface 122 of the second lens 120 is CA22, and the following conditions are satisfied: EPD*CA11/CA22=2.47 (mm).

In the optical lens assembly of the first embodiment, a maximum optical effective radius of the object-side surface 111 of the first lens 110 is CA11, a central thickness of the first lens 110 along the optical axis is CT1, a displacement parallel to the optical axis from an intersection point of the image-side surface 112 of the first lens 110 on the optical axis 190 to a position of the maximum effective radius of the image-side surface 112 of the first lens 110 is TDP2, and the following conditions are satisfied: CA11/(CT1*TDP2)=4.69 (mm$^{-1}$).

In the optical lens assembly of the first embodiment, a curvature radius of the object-side surface 161 of the sixth lens 160 is R11, a maximum optical effective radius of the image-side surface 162 of the sixth lens 160 is CA62, a central thickness of the sixth lens 160 along the optical axis 190 is CT6, and the following conditions are satisfied: R11*CA62/CT6<22.72 (mm).

In the optical lens assembly of the first embodiment, a distance from the object-side surface 111 of the first lens 110 to the image plane 180 along the optical axis 190 is TL, a distance between the position of the maximum optical effective radius of the image-side surface 112 of the first lens 110 and the stop 100 along the optical axis 190 is ET1S, and the following conditions are satisfied: TL/ET1S<6.50.

In the optical lens assembly of the first embodiment, a focal length of the optical lens assembly is f, a distance between the stop 100 and the image plane 180 along the optical axis 190 is CTSI, a maximum image height of the optical lens assembly is IMH, and the following conditions are satisfied: 1.82 (mm)<f*CTSI/IMH<3.98 (mm).

In the optical lens assembly of the first embodiment, a curvature radius of the image-side surface of the second lens is R4, a central thickness of the second lens along the optical axis is CT2, and the following conditions are satisfied: R4/CT2=−2.33.

In the optical lens assembly of the first embodiment, a distance from the object-side surface 111 of the first lens 110 to the image plane 180 along the optical axis 190 is TL, a focal length of the optical lens assembly is f, and the following conditions are satisfied: TL/f=3.10.

Refer to Table 1 and Table 2 below.

TABLE 1

First embodiment
f (focal length) = 2.50 mm (millimeters), Fno (f-number) = 2.27, FOV (field of view) = 116.63 deg (degrees).

| Surface | | Curvature radius (mm) | Central thickness/ gap (mm) | Material | Refractive index (nd) | Abbe number (vd) | Focal length (mm) |
|---|---|---|---|---|---|---|---|
| 0 | Object | Infinity | Infinity | | | | |
| 1 | First lens | −12.235 (ASP) | 0.499 | Plastic | 1.54 | 55.60 | −5.56 |
| 2 | | 4.001 (ASP) | 2.209 | | | | |
| 3 | Stop | Infinity | −0.096 | | | | |
| 4 | Second lens | 2.550 (ASP) | 1.069 | Plastic | 1.54 | 55.60 | 2.53 |
| 5 | | −2.486 (ASP) | 0.095 | | | | |
| 6 | Third lens | 10.600 (ASP) | 0.280 | Plastic | 1.66 | 20.40 | −5.99 |
| 7 | | 2.871 (ASP) | 0.178 | | | | |
| 8 | Fourth lens | 3.797 (ASP) | 0.499 | Plastic | 1.54 | 56.00 | 9.94 |
| 9 | | 12.042 (ASP) | 0.538 | | | | |
| 10 | Fifth lens | 10.215 (ASP) | 0.737 | Plastic | 1.54 | 55.60 | 3.67 |
| 11 | | −2.377 (ASP) | 0.334 | | | | |
| 12 | Sixth lens | 3.648 (ASP) | 0.405 | Plastic | 1.64 | 24.00 | −2.64 |
| 13 | | 1.105 (ASP) | 0.600 | | | | |
| 14 | IR-cut filter | Infinity | 0.210 | Glass | 1.52 | 64.20 | |
| 15 | | Infinity | 0.204 | | | | |
| 16 | Image Plane | Infinity | — | | | | |

Reference wavelength 555 nm

TABLE 2

| Aspheric coefficient | | | | | | |
|---|---|---|---|---|---|---|
| Surface | 1 | 2 | 4 | 5 | 6 | 7 |
| K: | 1.1188E+01 | −9.9800E+01 | 3.5889E−01 | −1.5412E−02 | −9.9800E+01 | −6.2829E+00 |
| A2: | 0.0000E+00 | 0.0000E+00 | 0.0000E+00 | 0.0000E+00 | 0.0000E+00 | 0.0000E+00 |
| A4: | 1.2063E−01 | 3.1818E−01 | −3.7906E−02 | −7.5934E−03 | −5.0262E−02 | −7.4129E−02 |
| A6 | −6.6462E−02 | −3.3471E−01 | 1.6447E−01 | −1.8975E−01 | −1.4618E−01 | 4.2648E−02 |
| A8: | 3.6955E−02 | 4.1489E−01 | −1.0876E+00 | 3.0961E−01 | −9.2409E−01 | 1.1347E−01 |
| A10: | −1.6370E−02 | −3.6867E−01 | 3.3620E+00 | −3.9981E−01 | −9.2409E−01 | −4.8128E−01 |
| A12: | 5.2610E−03 | 2.1848E−01 | −5.9725E+00 | 3.4533E−01 | 1.5267E+00 | 7.6494E−01 |
| A14: | −1.1572E−03 | −7.8674E−02 | 5.5586E+00 | −1.8582E−01 | −1.4259E+00 | −6.1075E−01 |
| A16: | 1.6102E−04 | 1.5085E−02 | −2.1404E+00 | 4.2033E−02 | 6.9053E−01 | 2.4878E−01 |
| A18: | −1.2628E−05 | −1.1697E−03 | 0.0000E+00 | 0.0000E+00 | −1.3492E−01 | −4.1420E−02 |
| A20: | 4.2402E−07 | 0.0000E+00 | 0.0000E+00 | 0.0000E+00 | 0.0000E+00 | 0.0000E+00 |
| Surface | 8 | 9 | 10 | 11 | 12 | 13 |
| K: | −7.6680E+01 | 5.0863E−01 | −9.9800E+01 | 2.5250E−01 | −9.9800E+01 | −6.5152E+00 |
| A2: | 0.0000E+00 | 0.0000E+00 | 0.0000E+00 | 0.0000E+00 | 0.0000E+00 | 0.0000E+00 |
| A4: | 4.9337E−02 | −8.6330E−02 | −2.4538E−02 | 2.7492E−02 | −2.7116E−01 | −1.4621E−01 |
| A6: | −2.2535E−01 | 2.8948E−02 | 1.3044E−02 | 9.7051E−02 | 2.2178E−01 | 1.3312E−01 |
| A8: | 5.1912E−01 | −2.4880E−02 | −4.1484E−02 | −8.7123E−02 | −6.3671E−02 | −8.6551E−02 |
| A10: | −7.2712E−01 | 4.7858E−02 | 2.1673E−02 | −1.0843E−02 | −9.0908E−02 | 3.6277E−02 |
| A12: | 6.1532E−01 | −4.8323E−02 | −1.0403E−02 | 4.7076E−02 | 1.0605E−01 | −9.9475E−03 |
| A14: | −3.2055E−01 | 1.9518E−02 | 7.6159E−03 | −2.9371E−02 | −5.3701E−02 | 1.7690E−03 |
| A16: | 9.7620E−02 | −1.4018E−03 | −3.0544E−03 | 9.3199E−03 | 1.4985E−02 | −1.9677E−04 |
| A18: | −1.3285E−02 | −1.1666E−03 | 3.0503E−04 | −1.5723E−03 | −2.1981E−03 | 1.2445E−05 |
| A20: | 0.0000E+00 | 3.0818E−04 | 4.4064E−05 | 1.1195E−04 | 1.3142E−04 | −3.4096E−07 |

Table 1 shows detailed configuration data of the first embodiment in FIG. 1A. Units of the curvature radius, the central thickness, the gap, and the focal length is mm. Surfaces 0 to 16 sequentially represent surfaces from an object side to an image side. Surface 3 is a gap between the stop 100 and the object-side surface 121 of the second lens 120 along the optical axis 190. The object-side surface 121 of the second lens 120 is closer to the object side than the stop 100, and therefore the stop 100 is represented by a negative value. Otherwise, if the stop 100 is closer to the object side than the object-side surface 121 of the second lens 120, the stop 100 is represented by a positive value. Surfaces 1, 4, 6, 8, 10, 12 and 14 are respectively central thicknesses of the first lens 110, the second lens 120, the third lens 130, the fourth lens 140, the fifth lens 150, the sixth lens 160, and the IR-cut filter 170 along the optical axis 190. Surfaces 2, 5, 7, 9, 11, 13 and 15 respectively are a gap between the first lens 110 and the stop 100 along the optical axis 190, a gap between the second lens 120 and the third lens 130 along the optical axis 190, a gap between the third lens 130 and the fourth lens 140 along the optical axis 190, a gap between the fourth lens 140 and the fifth lens 150 along the optical axis 190, a gap between the fifth lens 150 and the sixth lens 160 along the optical axis 190, a gap between the sixth lens 160 and the IR-cut filter 170 along the optical axis 190, and a gap between the IR-cut filter 170 and the image plane 180 along the optical axis 190.

Table 2 shows aspheric data in the first embodiment. k represents a conic constant in an aspheric curve equation, and A2, A4, A6, A8, A10, A12, A14, A16, A18 and A20 are high-order aspheric coefficients. In addition, the following tables of embodiments are schematic diagrams and aberration curves corresponding to the embodiments. The definitions of data in the tables of the embodiments are the same as the definitions in Table 1 and Table 2 of the first embodiment, and are not repeated herein.

Second Embodiment

Figure 2A:
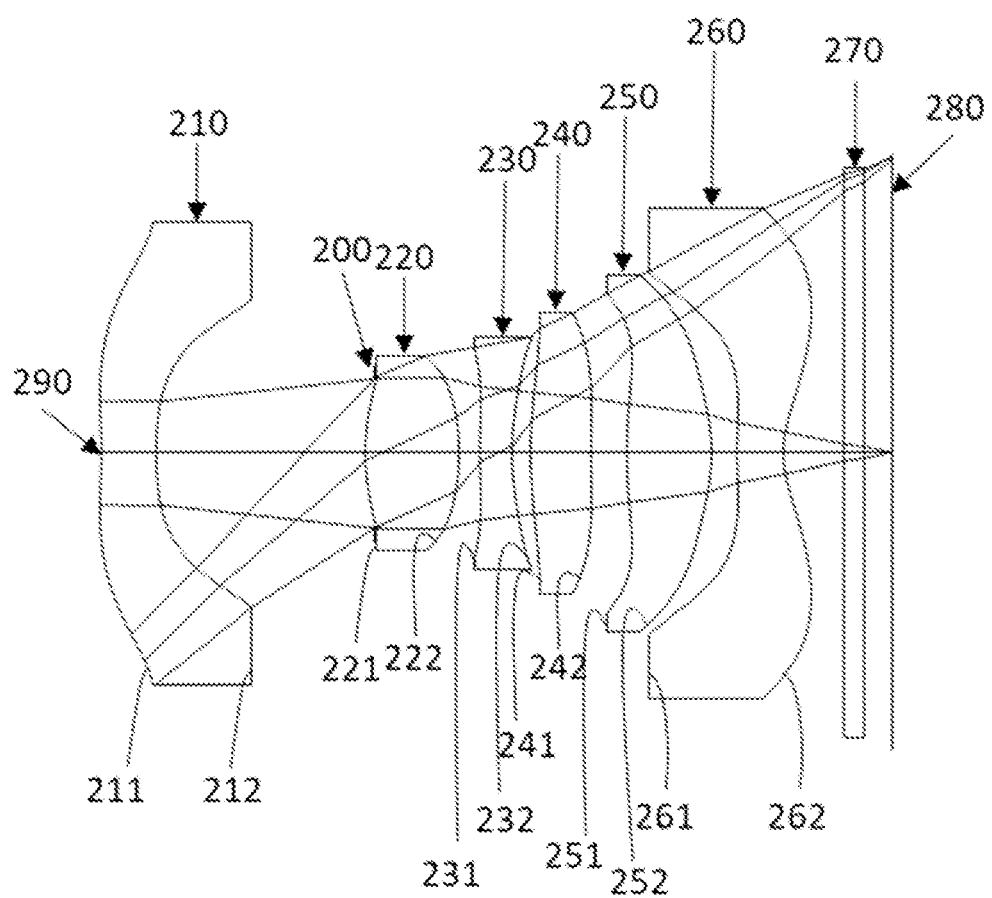
FIG. 2A is a schematic view of an optical lens assembly according to a second embodiment of the present disclosure.
Figure 2B:
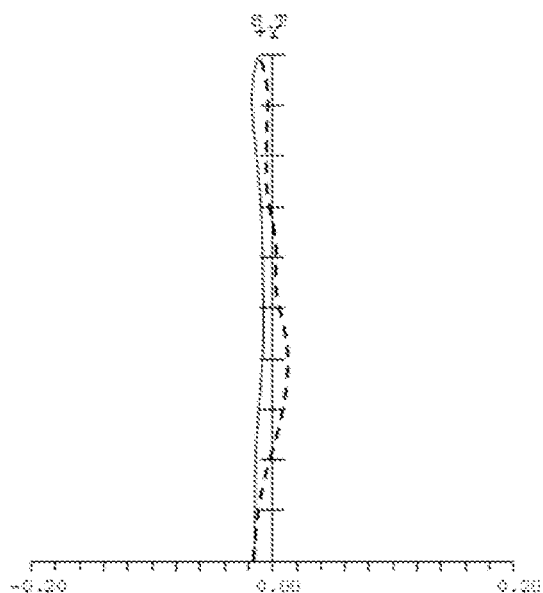
FIG. 2B sequentially shows a field curvature curve and a distortion curve of an optical lens assembly according to a second embodiment.
Figure 2B:
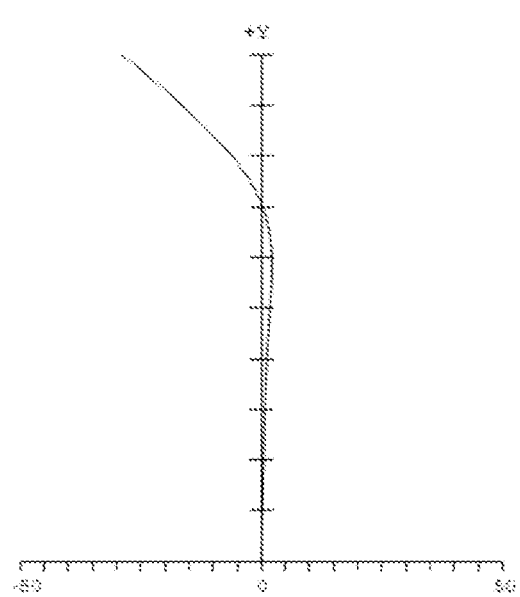

Refer to FIG. 2A and FIG. 2B. FIG. 2A is a schematic view of an optical lens assembly according to a second embodiment of the present disclosure, and FIG. 2B shows a field curvature curve and a distortion curve of an optical lens assembly according to a second embodiment. As can be seen from FIG. 2A, the optical lens assembly includes, in order from an object side to an image side: a stop 200, a first lens 210, a second lens 220, a third lens 230, a fourth lens 240, a fifth lens 250, a sixth lens 260, an IR-cut filter 270, and an image plane 280. A total quantity of lenses with refractive power in the optical lens assembly is six, but not limited thereto.

The first lens 210 with negative refractive power is made of a plastic material and includes an object-side surface 211 and an image-side surface 212, wherein the object-side surface 211 of the first lens 210 is concave near an optical axis 290, and the image-side surface 212 of the first lens 210 is concave near the optical axis 290. The object-side surface 211 and the image-side surface 212 are aspheric.

The second lens 220 with positive refractive power is made of a plastic material and includes an object-side surface 221 and an image-side surface 222, wherein the object-side surface 221 of the second lens 220 is convex near the optical axis 290, and the image-side surface 222 of the second lens 220 is convex near the optical axis 290. The object-side surface 221 and the image-side surface 222 are aspheric.

The third lens 230 with negative refractive power is made of a plastic material and includes an object-side surface 231 and an image-side surface 232, wherein the object-side surface 231 of the third lens 230 is convex near an optical axis 290, and the image-side surface 232 of the third lens 230 is concave near the optical axis 290. The object-side surface 231 and the image-side surface 232 are aspheric.

The fourth lens 240 with positive refractive power is made of a plastic material and includes an object-side surface 241 and an image-side surface 242, wherein the object-side surface 241 of the fourth lens 240 is convex near an optical axis 290, and the image-side surface 242 of the fourth lens 240 is concave near the optical axis 290. The object-side surface 241 and the image-side surface 242 are aspheric.

The fifth lens 250 with positive refractive power is made of a plastic material and includes an object-side surface 251 and an image-side surface 252, wherein the object-side surface 251 of the fifth lens 250 is convex near the optical axis 290, and the image-side surface 252 of the fifth lens 250 is convex near the optical axis 290. The object-side surface 251 and the image-side surface 252 are aspheric.

The sixth lens 260 with negative refractive power is made of a plastic material and includes an object-side surface 261 and an image-side surface 262, wherein the object-side surface 261 of the sixth lens 260 is convex near the optical axis 290, and the image-side surface 262 of the sixth lens 260 is concave near the optical axis 290. The object-side surface 261 and the image-side surface 262 are aspheric.

The IR-cut filter 270 is made of glass, and is disposed between the sixth lens 260 and the image plane 280 without affecting a focal length of the optical lens assembly. It can be understood that, the IR-cut filter 270 may also be formed on the surface of the above-mentioned lens. The IR-cut filter 270 may also be made of other materials.

Refer to Table 3 and Table 4 below.

TABLE 3

Second embodiment
f (focal length) = 2.50 mm (millimeters), Fno (f-number) = 2.28, FOV (field of view) = 121.20 deg (degree)

| Surface | | Curvature radius (mm) | Central thickness/ gap (mm) | Material | Refractive index (nd) | Abbe number (vd) | Focal length (mm) |
|---|---|---|---|---|---|---|---|
| 0 | Object | Infinity | Infinity | | | | |
| 2 | First lens | −7.399 (ASP) | 0.548 | Plastic | 1.54 | 55.60 | −5.49 |
| 3 | | 5.025 (ASP) | 2.164 | | | | |
| | Stop | Infinity | −0.094 | | | | |
| 4 | Second lens | 2.552 (ASP) | 0.935 | Plastic | 1.54 | 55.60 | 2.71 |
| 5 | | −2.956 (ASP) | 0.213 | | | | |
| 6 | Third lens | 8.876 (ASP) | 0.320 | Plastic | 1.67 | 19.24 | −7.30 |
| 7 | | 3.129 (ASP) | 0.188 | | | | |
| 8 | Fourth lens | 4.872 (ASP) | 0.589 | Plastic | 1.54 | 56.00 | 14.65 |
| 9 | | 11.913 (ASP) | 0.355 | | | | |
| 10 | Fifth lens | 5.633 (ASP) | 0.841 | Plastic | 1.54 | 55.60 | 3.03 |
| 11 | | −2.169 (ASP) | 0.257 | | | | |
| 12 | Sixth lens | 4.302 (ASP) | 0.466 | Plastic | 1.64 | 24.00 | −2.49 |
| 13 | | 1.114 (ASP) | 0.600 | | | | |
| 14 | IR-cut filter | Infinity | 0.210 | Glass | 1.52 | 64.20 | |
| 15 | | Infinity | 0.268 | | | | |
| 16 | Image Plane | Infinity | — | | | | |

Reference wavelength 555 nm

TABLE 4

Aspheric coefficient

| Surface | 1 | 2 | 4 | 5 | 6 | 7 |
|---|---|---|---|---|---|---|
| K: | 4.6398E+00 | −9.9800E+01 | 1.0487E−01 | 1.0270E+00 | −9.5156E+01 | −4.4419E+00 |
| A2: | 0.0000E+00 | 0.0000E+00 | 0.0000E+00 | 0.0000E+00 | 0.0000E+00 | 0.0000E+00 |
| A4: | 1.1230E−01 | 2.2950E−01 | −3.2900E−02 | −4.4496E−02 | −8.6791E−02 | −7.5770E−02 |
| A6: | −5.5459E−02 | −1.4953E−01 | 1.0337E−01 | −6.4137E−02 | 8.3425E−02 | 1.1296E−01 |
| A8: | 2.5926E−02 | 1.2421E−01 | −8.0571E−01 | 1.0659E−01 | 6.0332E−01 | −1.4473E−01 |
| A10: | −9.4070E−03 | −7.7016E−02 | 2.6155E+00 | −2.2408E−01 | 6.0332E−01 | 4.0930E−02 |
| A12: | 2.4609E−03 | 3.4006E−02 | −4.8679E+00 | 2.6431E−01 | −5.5506E−01 | 1.4228E−01 |
| A14: | −4.4379E−04 | −8.9217E−03 | 4.6991E+00 | −1.7385E−01 | 2.6699E−01 | −1.7807E−01 |
| A16: | 5.1325E−05 | 9.6313E−04 | −1.8687E+00 | 4.2939E−02 | −5.2215E−02 | 8.5906E−02 |
| A18: | −3.3830E−06 | −2.9562E−06 | 0.0000E+00 | 0.0000E+00 | 0.0000E+00 | −1.5634E−02 |
| A20: | 9.5982E−08 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | −6.5945E+01 | 5.2028E+00 | −1.5917E+01 | −2.4462E−01 | −9.8479E+01 | −5.7830E+00 |
| A2: | 0.0000E+00 | 0.0000E+00 | 0.0000E+00 | 0.0000E+00 | 0.0000E+00 | 0.0000E+00 |
| A4: | −9.3326E−03 | −8.1074E−02 | 3.0437E−03 | 1.0398E−01 | −2.0562E−01 | −1.2082E−01 |
| A6: | −1.7516E−02 | −3.4107E−02 | −6.7268E−02 | −2.3785E−02 | 1.4917E−01 | 9.0546E−02 |
| A8: | 1.4223E−01 | 1.4298E−01 | 8.2007E−02 | 1.6951E−02 | −8.3473E−02 | −4.9757E−02 |
| A10: | −2.7819E−01 | −2.0155E−01 | −8.4447E−02 | −3.5551E−02 | 3.7071E−02 | 1.8211E−02 |
| A12: | 2.6140E−01 | 1.8452E−01 | 5.2631E−02 | 2.2349E−02 | −2.3955E−02 | −4.4841E−03 |
| A14: | −1.3579E−01 | −1.1593E−01 | −1.7895E−02 | −5.7770E−03 | 1.2920E−02 | 7.3494E−04 |
| A16: | 3.8435E−02 | 4.6417E−02 | 2.9057E−03 | 5.1459E−04 | −3.8722E−03 | −7.7136E−05 |
| A18: | −4.7109E−03 | −1.0409E−02 | −1.2621E−04 | 2.3886E−05 | 5.8391E−04 | 4.6990E−06 |
| A20: | 0.0000E+00 | 9.8805E−04 | −9.4887E−06 | −4.3706E−06 | −3.5077E−05 | −1.2608E−07 |

In the second embodiment, an aspheric curve equation is expressed as that in the first embodiment. In addition, definitions of parameters in the following tables are the same as those in the first embodiment, and are not repeated herein.

Referring to Table 3 and Table 4, the following data may be calculated:

| Second embodiment | | | |
|---|---|---|---|
| CRA/CA62 | 12.97 | EPD* CA11/CA22 | 2.60 |
| TDP2*HFOV/Fno | 25.02 | CA11/(CT1*TDP2) | 4.79 |
| f/R10 | −1.15 | R11*CA62/CT6 | 24.10 |
| f3/f5 | −2.41 | TL/ET1S | 6.43 |
| TL/IMH | 2.47 | f*CTSI/IMH | 4.05 |
| (f2/CT2) − (f5/CT5) | −0.70 | R4/CT2 | −3.16 |
| CRA/(TL − BFL) | 5.00 | TL/f | 3.14 |
| HFOV*(CA11/IMH) | 47.14 | | |

Third Embodiment

Figure 3A:
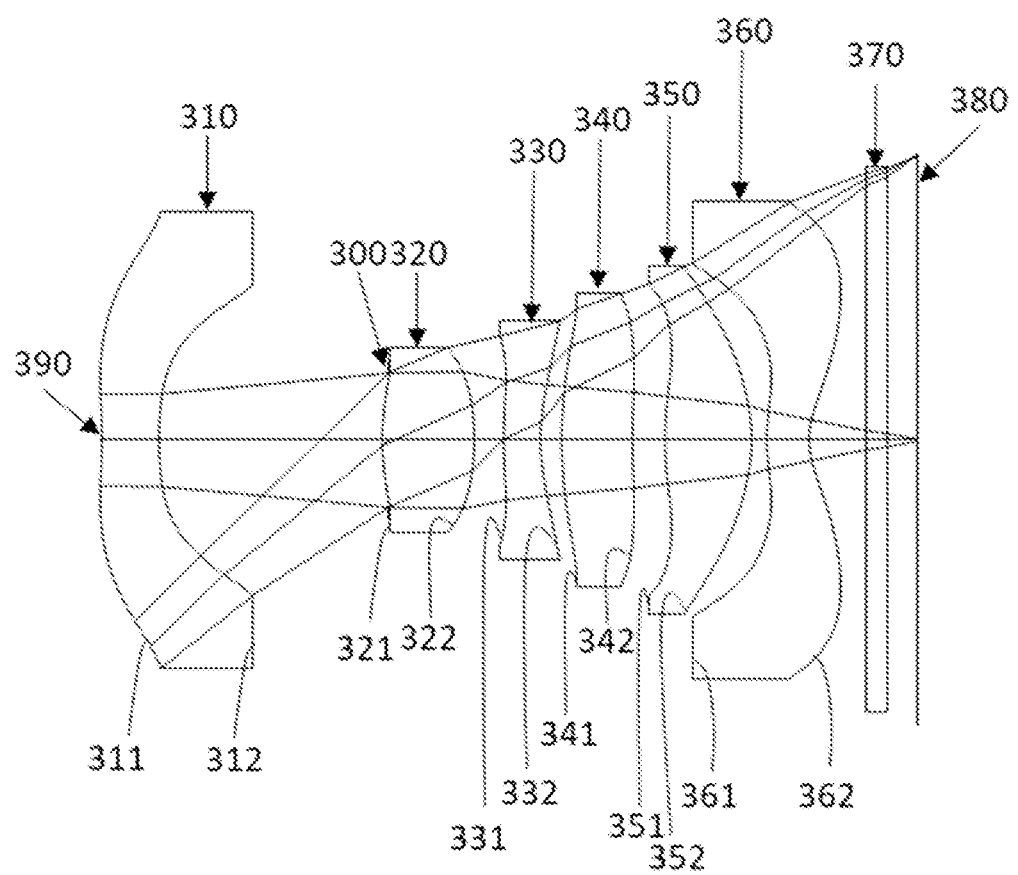
FIG. 3A is a schematic view of an optical lens assembly according to a third embodiment of the present disclosure of the present disclosure.
Figure 3B:
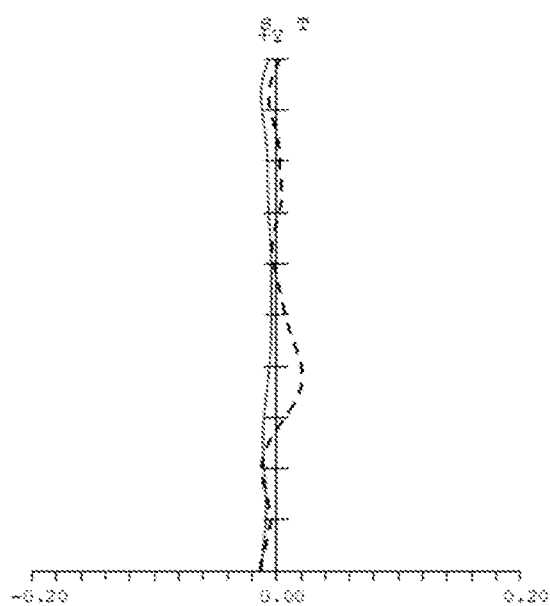
FIG. 3B shows a field curvature curves and a distortion curve of the optical lens assembly according to the third embodiment.
Figure 3B:
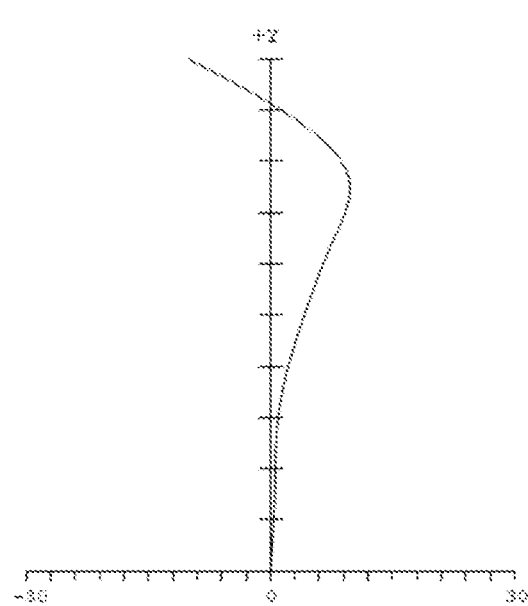

Refer to FIG. 3A and FIG. 3B. FIG. 3A is a schematic view of an optical lens assembly according to a third embodiment of the present disclosure, and FIG. 3B shows a field curvature curve and a distortion curve of an optical lens assembly according to a second embodiment. As can be seen from FIG. 3A, the optical lens assembly includes, in order from an object side to an image side: a stop 300, a first lens 310, a second lens 320, a third lens 330, a fourth lens 340, a fifth lens 350, a sixth lens 360, an TR-cut filter 370, and an image plane 380. A total quantity of lenses with refractive power in the optical lens assembly is six, but not limited thereto.

The first lens 310 with negative refractive power is made of a plastic material and includes an object-side surface 311 and an image-side surface 312, wherein the object-side surface 311 of the first lens 310 is concave near an optical axis 390, and the image-side surface 312 of the first lens 310 is concave near the optical axis 390. The object-side surface 311 and the image-side surface 312 are aspheric.

The second lens 320 with positive refractive power is made of a plastic material and includes an object-side surface 321 and an image-side surface 322, wherein the object-side surface 321 of the second lens 320 is convex near the optical axis 390, and the image-side surface 322 of the second lens 320 is convex near the optical axis 390. The object-side surface 321 and the image-side surface 322 are aspheric.

The third lens 330 with negative refractive power is made of a plastic material and includes an object-side surface 331 and an image-side surface 332, wherein the object-side surface 331 of the third lens 330 is convex near an optical axis 390, and the image-side surface 332 of the third lens 330 is concave near the optical axis 390. The object-side surface 331 and the image-side surface 332 are aspheric.

The fourth lens 340 with positive refractive power is made of a plastic material and includes an object-side surface 341 and an image-side surface 342, wherein the object-side surface 341 of the fourth lens 340 is convex near an optical axis 390, and the image-side surface 342 of the fourth lens 340 is concave near the optical axis 390. The object-side surface 341 and the image-side surface 342 are aspheric.

The fifth lens 350 with positive refractive power is made of a plastic material and includes an object-side surface 351 and an image-side surface 352, wherein the object-side surface 351 of the fifth lens 350 is convex near the optical axis 390, and the image-side surface 352 of the fifth lens 350 is convex near the optical axis 390. The object-side surface 351 and the image-side surface 352 are aspheric.

The sixth lens 360 with negative refractive power is made of a plastic material and includes an object-side surface 361 and an image-side surface 362, wherein the object-side surface 361 of the sixth lens 360 is convex near the optical axis 390, and the image-side surface 362 of the sixth lens 360 is concave near the optical axis 390. The object-side surface 361 and the image-side surface 362 are aspheric.

The TR-cut filter 370 is made of glass, and is disposed between the sixth lens 360 and the image plane 380 without affecting a focal length of the optical lens assembly. It can be understood that, the TR-cut filter 370 may also be formed on the surface of the above-mentioned lens. The TR-cut filter 370 may also be made of other materials.

Refer to Table 5 and Table 6 below.

TABLE 5

Third embodiment
f (focal length) = 2.40 mm (millimeters), Fno (f-number) = 2.36, FOV (field of view) = 115.52 deg (degree).

| Surface # | | Curvature radius (mm) | Central thickness/ gap (mm) | Material | Refractive index (nd) | Abbe number (vd) | Focal length (mm) |
|---|---|---|---|---|---|---|---|
| 0 | Object | Infinity | Infinity | | | | |
| 1 | First lens | −7.225 (ASP) | 0.598 | Plastic | 1.54 | 56.00 | −5.75 |
| 2 | | 5.723 (ASP) | 2.376 | | | | |
| 3 | Stop | Infinity | −0.059 | | | | |
| 4 | Second lens | 3.245 (ASP) | 0.953 | Plastic | 1.54 | 55.60 | 3.01 |
| 5 | | −2.890 (ASP) | 0.304 | | | | |
| 6 | Third lens | 5.075 (ASP) | 0.382 | Plastic | 1.67 | 19.20 | −8.29 |
| 7 | | 2.586 (ASP) | 0.220 | | | | |
| 8 | Fourth lens | 4.997 (ASP) | 0.724 | Plastic | 1.54 | 56.00 | 30.37 |
| 9 | | 6.784 (ASP) | 0.342 | | | | |
| 10 | Fifth lens | 4.185 (ASP) | 0.904 | Plastic | 1.54 | 55.60 | 2.48 |
| 11 | | −1.804 (ASP) | 0.156 | | | | |
| 12 | Sixth lens | 2.275 (ASP) | 0.440 | Plastic | 1.66 | 20.40 | −2.33 |
| 13 | | 0.881 (ASP) | 0.594 | | | | |
| 14 | IR-cut filter | Infinity | 0.210 | glass | 1.52 | 64.20 | |
| 15 | | Infinity | 0.314 | | | | |
| 16 | Image Plane | Infinity | — | | | | |

Reference wavelength 555 nm

TABLE 6

Aspheric coefficient

| Surface | 1 | 2 | 4 | 5 | 6 | 7 |
|---|---|---|---|---|---|---|
| K: | 3.2290E+00 | −9.1153E+01 | −3.5448E−01 | 3.7087E−01 | −5.3292E+01 | −6.2468E+00 |
| A2: | 0.0000E+00 | 0.0000E+00 | 0.0000E+00 | 0.0000E+00 | 0.0000E+00 | 0.0000E+00 |
| A4: | 9.5520E−02 | 1.6651E−01 | −3.1063E−02 | −5.2215E−02 | −5.0738E−02 | −2.8651E−02 |
| A6: | −3.1588E−02 | −4.2564E−02 | 3.4505E−02 | −7.3097E−02 | −3.5044E−02 | 1.0933E−02 |
| A8: | 8.1486E−03 | 6.6565E−03 | −4.2583E−01 | 1.6630E−01 | 3.1134E−01 | −8.4817E−02 |
| A10: | −1.3299E−03 | −9.9205E−04 | 1.5533E+00 | −2.5762E−01 | 3.1134E−01 | 1.5388E−01 |
| A12: | 1.2438E−04 | 3.9223E−03 | −3.3146E+00 | 2.0016E−01 | −3.5528E−01 | −1.2091E−01 |
| A14: | −6.7083E−06 | −2.0560E−03 | 3.6894E+00 | −7.9011E−02 | 1.8774E−01 | 4.6092E−02 |
| A16: | 1.8219E−07 | 2.8100E−04 | −1.7068E+00 | 8.0439E−03 | −3.8654E−02 | −6.9608E−03 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | −2.3456E+01 | 1.0097E+01 | −1.8175E+01 | −6.2796E−01 | −3.3025E+01 | −5.1558E+00 |
| A2: | 0.0000E+00 | 0.0000E+00 | 0.0000E+00 | 0.0000E+00 | 0.0000E+00 | 0.0000E+00 |
| A4: | −2.2143E−02 | −9.4928E−02 | 5.6760E−02 | 2.6444E−01 | −5.5816E−02 | −1.2122E−01 |
| A6: | 8.9743E−02 | −1.0424E−02 | −1.9772E−01 | −3.9063E−01 | −2.0840E−01 | 7.0683E−02 |
| A8: | −1.2049E−01 | 8.7180E−02 | 1.7592E−01 | 3.2710E−01 | 2.8328E−01 | −2.7958E−02 |
| A10: | 8.7074E−02 | −8.1768E−02 | −8.9598E−02 | −1.5707E−01 | −1.7830E−01 | 7.4985E−03 |
| A12: | −3.6527E−02 | 3.7712E−02 | 2.7781E−02 | 4.3119E−02 | 6.5083E−02 | −1.3790E−03 |
| A14: | 7.9545E−03 | −9.3285E−03 | −4.8953E−03 | −6.2670E−03 | −1.4492E−02 | 1.6473E−04 |
| A16: | −6.4695E−04 | 9.8322E−04 | 3.6900E−04 | 3.7324E−04 | 1.8411E−03 | −1.1507E−05 |
| A18: | 0.0000E+00 | 0.0000E+00 | 0.0000E+00 | 0.0000E+00 | −1.0143E−04 | 3.5710E−07 |
| A20: | 0.0000E+00 | 0.0000E+00 | 0.0000E+00 | 0.0000E+00 | 0.0000E+00 | 0.0000E+00 |

In the third embodiment, an aspheric curve equation is expressed as that in the first embodiment. In addition, definitions of parameters in the following tables are the same as those in the first embodiment, and are not repeated herein.

Referring to Table 5 and Table 6, the following data may be calculated:

| Third embodiment | | | |
|---|---|---|---|
| CRA/CA62 | 11.58 | EPD* CA11/CA22 | 2.51 |
| TDP2*HFOV/Fno | 22.99 | CA11/(CT1*TDP2) | 4.36 |
| f/R10 | −1.33 | R11*CA62/CT6 | 13.74 |
| f3/f5 | −3.34 | TL/ET1S | 6.03 |
| TL/IMH | 2.66 | f*CTSI/IMH | 4.14 |
| (f2/CT2) − (f5/CT5) | 0.42 | R4/CT2 | −3.03 |
| CRA/(TL − BFL) | 4.19 | TL/f | 3.52 |
| HFOV*(CA11/IMH) | 44.44 | | |

Fourth Embodiment

Figure 4A:
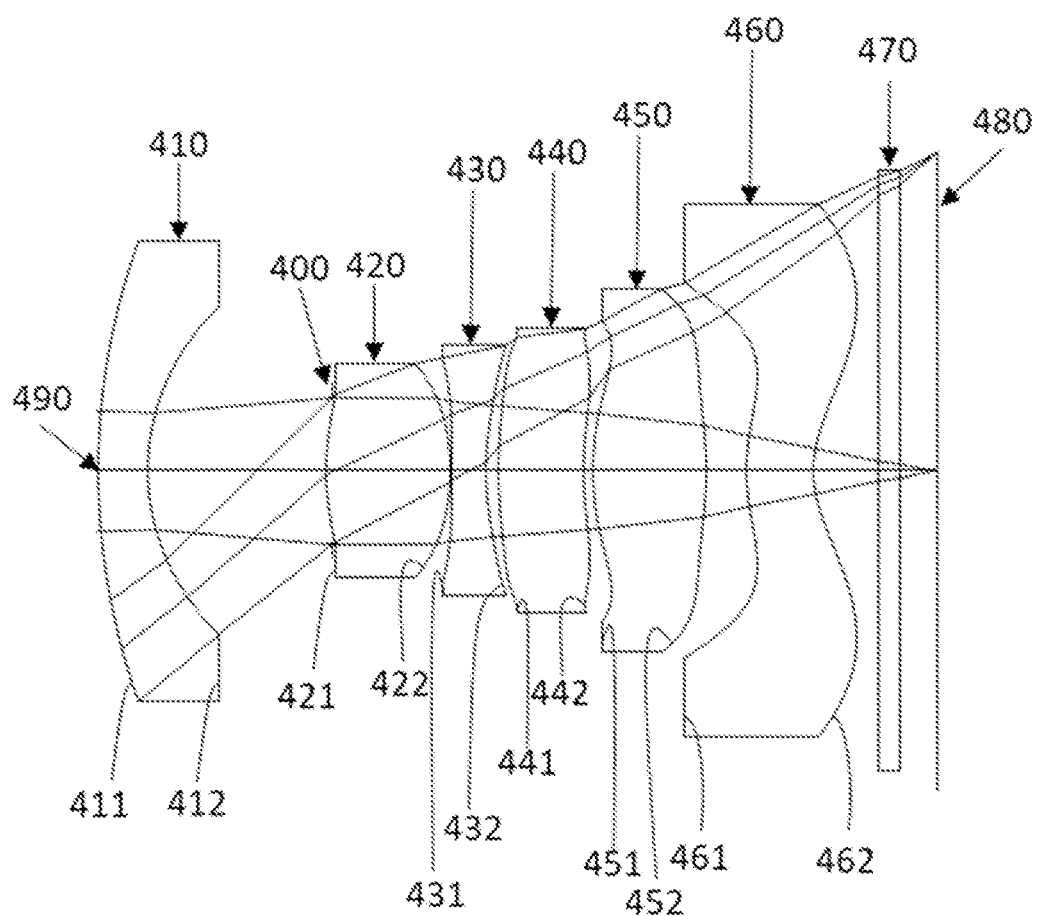
FIG. 4A is a schematic view of an optical lens assembly according to a fourth embodiment of the present disclosure of the present disclosure.
Figure 4B:
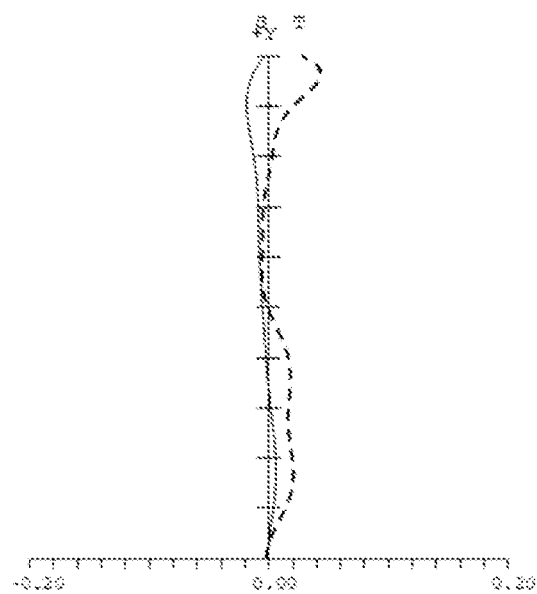
FIG. 4B shows a field curvature curves and a distortion curve of the optical lens assembly according to the fourth embodiment.
Figure 4B:
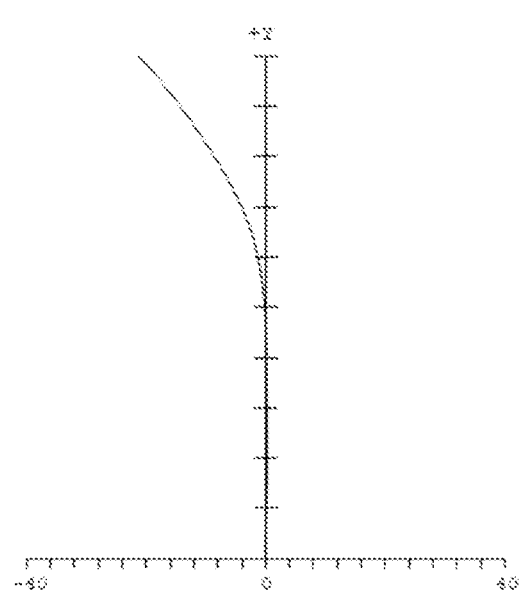

Refer to FIG. 4A and FIG. 4B. FIG. 4A is a schematic view of an optical lens assembly according to a fourth embodiment of the present disclosure, and FIG. 4B shows a field curvature curve and a distortion curve of an optical lens assembly according to a second embodiment. As can be seen from FIG. 4A, the optical lens assembly includes, in order from an object side to an image side: a stop 400, a first lens 410, a second lens 420, a third lens 430, a fourth lens 440, a fifth lens 450, a sixth lens 460, an IR-cut filter 470, and an image plane 480. A total quantity of lenses with refractive power in the optical lens assembly is six, but not limited thereto.

The first lens 410 with negative refractive power is made of a plastic material and includes an object-side surface 411 and an image-side surface 412, wherein the object-side surface 411 of the first lens 410 is convex near an optical axis 490, and the image-side surface 412 of the first lens 410 is concave near the optical axis 490. The object-side surface 411 and the image-side surface 412 are aspheric.

The second lens 420 with positive refractive power is made of a plastic material and includes an object-side surface 421 and an image-side surface 422, wherein the object-side surface 421 of the second lens 420 is convex near the optical axis 490, and the image-side surface 422 of the second lens 420 is convex near the optical axis 490. The object-side surface 421 and the image-side surface 422 are aspheric.

The third lens 430 with negative refractive power is made of a plastic material and includes an object-side surface 431 and an image-side surface 432, wherein the object-side surface 431 of the third lens 430 is concave near an optical axis 490, and the image-side surface 432 of the third lens 430 is concave near the optical axis 490. The object-side surface 431 and the image-side surface 432 are aspheric.

The fourth lens 440 with positive refractive power is made of a plastic material and includes an object-side surface 441 and an image-side surface 442, wherein the object-side surface 441 of the fourth lens 440 is convex near an optical axis 490, and the image-side surface 442 of the fourth lens 440 is concave near the optical axis 490. The object-side surface 441 and the image-side surface 442 are aspheric.

The fifth lens 450 with positive refractive power is made of a plastic material and includes an object-side surface 451 and an image-side surface 452, wherein the object-side surface 451 of the fifth lens 450 is convex near the optical axis 490, and the image-side surface 452 of the fifth lens 450 is convex near the optical axis 490. The object-side surface 451 and the image-side surface 452 are aspheric.

The sixth lens 460 with negative refractive power is made of a plastic material and includes an object-side surface 461 and an image-side surface 462, wherein the object-side surface 461 of the sixth lens 460 is convex near the optical axis 490, and the image-side surface 462 of the sixth lens 460 is concave near the optical axis 490. The object-side surface 461 and the image-side surface 462 are aspheric.

The IR-cut filter 470 is made of glass, and is disposed between the sixth lens 460 and the image plane 480 without affecting a focal length of the optical lens assembly. It can be understood that, the IR-cut filter 470 may also be formed on the surface of the above-mentioned lens. The IR-cut filter 470 may also be made of other materials.

Refer to Table 7 and Table 8 below.

TABLE 7

Fourth embodiment
f (focal length) = 2.86 mm (millimeters), Fno (f-number) = 2.38, FOV (field of view) = 109.41 deg (degree).

| Surface | | Curvature radius (mm) | Central thickness/ gap (mm) | Material | Refractive index (nd) | Abbe number (vd) | Focal length (mm) |
|---|---|---|---|---|---|---|---|
| 0 | Object | Infinity | Infinity | | | | |
| 1 | First lens | 7.068 (ASP) | 0.470 | Plastic | 1.52 | 64.10 | −7.08 |
| 2 | | 2.359 (ASP) | 1.730 | | | | |
| 3 | Stop | Infinity | −0.058 | | | | |
| 4 | Second lens | 2.866 (ASP) | 1.165 | Plastic | 1.54 | 56.00 | 2.65 |
| 5 | | −2.507 (ASP) | 0.015 | | | | |
| 6 | Third lens | −141.601 (ASP) | 0.325 | Plastic | 1.64 | 22.50 | −4.62 |
| 7 | | 3.059 (ASP) | 0.108 | | | | |
| 8 | Fourth lens | 4.421 (ASP) | 0.807 | Plastic | 1.54 | 56.00 | 293.28 |
| 9 | | 4.254 (ASP) | 0.084 | | | | |
| 10 | Fifth lens | 3.220 (ASP) | 1.068 | Plastic | 1.54 | 56.00 | 3.39 |
| 11 | | −3.840 (ASP) | 0.371 | | | | |
| 12 | Sixth lens | 2.114 (ASP) | 0.629 | Plastic | 1.64 | 22.50 | −5.42 |
| 13 | | 1.165 (ASP) | 0.613 | | | | |
| 14 | IR-cut filter | Infinity | 0.210 | Glass | 1.52 | 64.20 | |
| 15 | | Infinity | 0.345 | | | | |
| 16 | Image Plane | Infinity | — | | | | |

Reference wavelength 555 nm

TABLE 8

Aspheric coefficient

| Surface | 1 | 2 | 4 | 5 | 6 | 7 |
|---|---|---|---|---|---|---|
| K: | 0.0000E+00 | 0.0000E+00 | −4.0181E+00 | 8.9129E−01 | −1.5104E+02 | −2.1727E+00 |
| A2: | 0.0000E+00 | 0.0000E+00 | 0.0000E+00 | 0.0000E+00 | 0.0000E+00 | 0.0000E+00 |
| A4: | 0.0000E+00 | 0.0000E+00 | −4.4270E−03 | −4.1013E−03 | −1.7492E−02 | −2.7665E−02 |
| A6: | 0.0000E+00 | 0.0000E+00 | −8.5581E−02 | −2.3709E−01 | −2.7690E−01 | −1.1807E−01 |
| A8: | 0.0000E+00 | 0.0000E+00 | 3.3809E−01 | 5.9206E−01 | −7.5417E−01 | 2.3565E−01 |
| A10: | 0.0000E+00 | 0.0000E+00 | −9.2360E−01 | −7.3826E−01 | −7.5417E−01 | −1.9204E−01 |
| A12: | 0.0000E+00 | 0.0000E+00 | 1.1482E+00 | 4.4360E−01 | 4.0866E−01 | 7.5642E−02 |
| A14: | 0.0000E+00 | 0.0000E+00 | −5.4066E−01 | −1.0526E−01 | −8.5867E−02 | −1.1569E−02 |
| A16: | 0.0000E+00 | 0.0000E+00 | −5.6498E−04 | 3.0909E−04 | 2.2900E−04 | 1.3818E−05 |
| A18: | 0.0000E+00 | 0.0000E+00 | 1.8023E−02 | 4.1099E−04 | −2.7957E−06 | 2.4861E−05 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | −2.0627E+01 | 5.6175E+00 | −1.2480E+01 | 9.7083E−01 | −1.4527E+01 | −2.4753E+00 |
| A2: | 0.0000E+00 | 0.0000E+00 | 0.0000E+00 | 0.0000E+00 | 0.0000E+00 | 0.0000E+00 |
| A4: | −1.6018E−02 | 3.2060E−02 | 1.6949E−01 | 6.5029E−02 | 1.1832E−02 | −9.0145E−02 |
| A6: | −4.0562E−02 | −2.7015E−01 | −2.8560E−01 | 2.5899E−02 | −1.2499E−01 | 2.1568E−02 |
| A8: | 6.3023E−02 | 3.0006E−01 | 2.6279E−01 | −4.4547E−02 | 8.8961E−02 | −1.9807E−03 |
| A10: | −2.5802E−02 | −2.1320E−01 | −1.7039E−01 | 1.9323E−02 | −4.1262E−02 | −5.2346E−04 |
| A12: | 4.7118E−03 | 9.6861E−02 | 6.8514E−02 | −4.5145E−03 | 1.1575E−02 | 1.6772E−04 |
| A14: | −2.4999E−04 | −2.4820E−02 | −1.5667E−02 | 5.5899E−04 | −1.7042E−03 | −1.7166E−05 |
| A16: | 8.8011E−07 | 2.8886E−03 | 1.5480E−03 | −2.8606E−05 | 1.0118E−04 | 6.0939E−07 |
| A18: | −2.2110E−07 | 1.7862E−06 | 1.8163E−06 | 3.8240E−08 | 5.1566E−08 | −1.7636E−11 |
| A20: | 0.0000E+00 | 0.0000E+00 | 0.0000E+00 | 0.0000E+00 | 0.0000E+00 | 0.0000E+00 |

In the Fourth embodiment, an aspheric curve equation is expressed as that in the first embodiment. In addition, definitions of parameters in the following tables are the same as those in the first embodiment, and are not repeated herein.

Referring to Table 7 and Table 8, the following data may be calculated:

| Fourth embodiment | | | |
|---|---|---|---|
| CRA/CA62 | 12.92 | EPD* CA11/CA22 | 2.57 |
| TDP2*HFOV/Fno | 15.24 | CA11/(CT1*TDP2) | 7.40 |
| f/R10 | −0.74 | R11*CA62/CT6 | 8.97 |

-continued

| Fourth embodiment | | | |
|---|---|---|---|
| f3/f5 | −1.36 | TL/ET1S | 7.39 |
| TL/IMH | 2.48 | f*CTSI/IMH | 5.11 |
| (f2/CT2) − (f5/CT5) | −0.90 | R4/CT2 | −2.15 |
| CRA/(TL − BFL) | 5.14 | TL/f | 2.76 |
| HFOV*(CA11/IMH) | 39.62 | | |

Fifth Embodiment

Figure 5A:
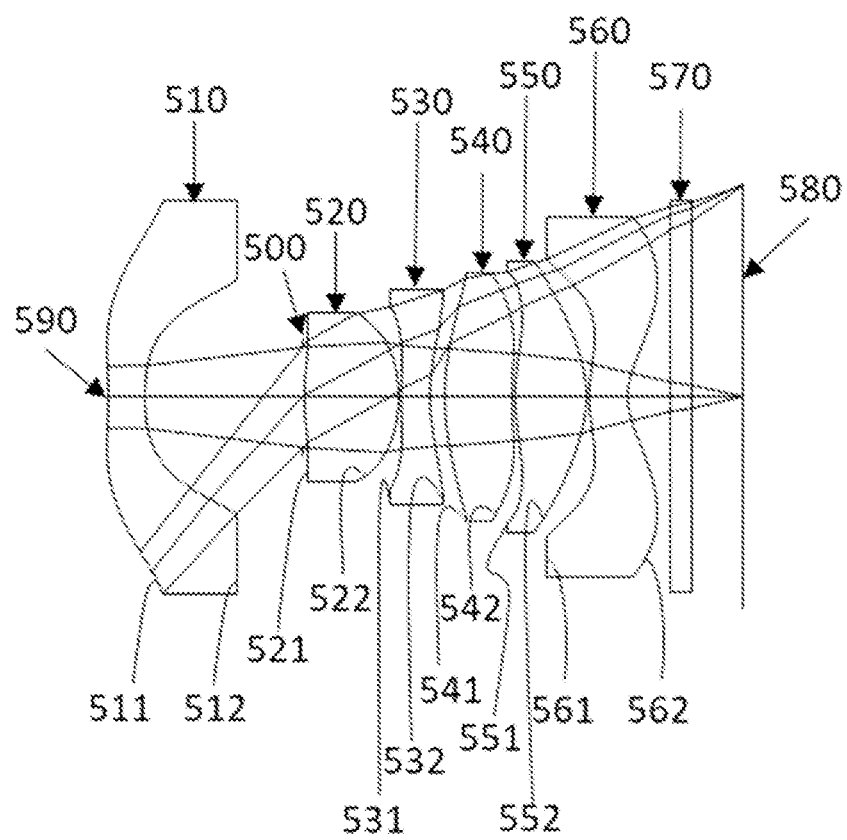
FIG. 5A is a schematic view of an optical lens assembly according to a fifth embodiment of the present disclosure of the present disclosure.
Figure 5B:
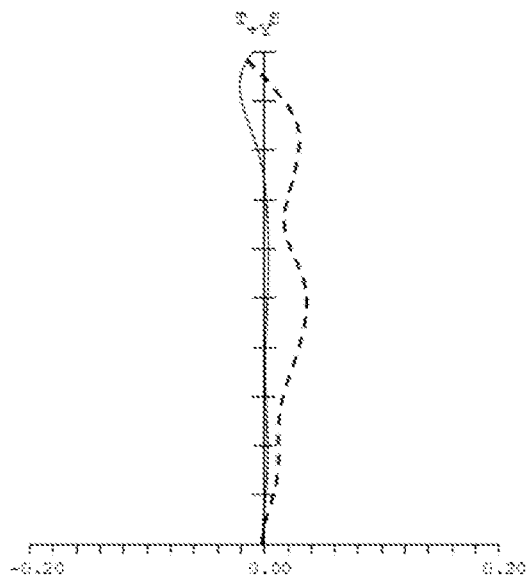
FIG. 5B shows a field curvature curves and a distortion curve of the optical lens assembly according to the fifth embodiment.
Figure 5B:
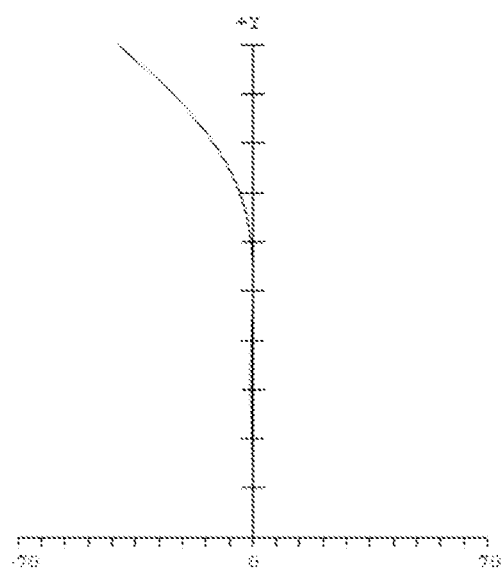

Refer to FIG. 5A and FIG. 5B. FIG. 5A is a schematic view of an optical lens assembly according to a fifth embodiment of the present disclosure, and FIG. 5B shows a field curvature curve and a distortion curve of an optical lens assembly according to a second embodiment. As can be seen from FIG. 5A, the optical lens assembly includes, in order from an object side to an image side: a stop 500, a first lens 510, a second lens 520, a third lens 530, a fourth lens 540, a fifth lens 550, a sixth lens 560, an IR-cut filter 570, and an image plane 580. A total quantity of lenses with refractive power in the optical lens assembly is six, but not limited thereto.

The first lens 510 with negative refractive power is made of a plastic material and includes an object-side surface 511 and an image-side surface 512, wherein the object-side surface 511 of the first lens 510 is concave near an optical axis 590, and the image-side surface 512 of the first lens 510 is concave near the optical axis 590. The object-side surface 511 and the image-side surface 512 are aspheric.

The second lens 520 with positive refractive power is made of a plastic material and includes an object-side surface 521 and an image-side surface 522, wherein the object-side surface 521 of the second lens 520 is convex near the optical axis 590, and the image-side surface 522 of the second lens 520 is convex near the optical axis 590. The object-side surface 521 and the image-side surface 522 are aspheric.

The third lens 530 with negative refractive power is made of a plastic material and includes an object-side surface 531 and an image-side surface 532, wherein the object-side surface 531 of the third lens 530 is convex near an optical axis 590, and the image-side surface 532 of the third lens 530 is concave near the optical axis 590. The object-side surface 531 and the image-side surface 532 are aspheric.

The fourth lens 540 with positive refractive power is made of a plastic material and includes an object-side surface 541 and an image-side surface 542, wherein the object-side surface 541 of the fourth lens 540 is convex near an optical axis 590, and the image-side surface 542 of the fourth lens 540 is concave near the optical axis 590. The object-side surface 541 and the image-side surface 542 are aspheric.

The fifth lens 550 with positive refractive power is made of a plastic material and includes an object-side surface 551 and an image-side surface 552, wherein the object-side surface 551 of the fifth lens 550 is convex near the optical axis 590, and the image-side surface 552 of the fifth lens 550 is convex near the optical axis 590. The object-side surface 551 and the image-side surface 552 are aspheric.

The sixth lens 560 with negative refractive power is made of a plastic material and includes an object-side surface 561 and an image-side surface 562, wherein the object-side surface 561 of the sixth lens 560 is convex near the optical axis 590, and the image-side surface 562 of the sixth lens 560 is concave near the optical axis 590. The object-side surface 561 and the image-side surface 562 are aspheric.

The IR-cut filter 570 is made of glass, and is disposed between the sixth lens 560 and the image plane 580 without affecting a focal length of the optical lens assembly. It can be understood that, the IR-cut filter 570 may also be formed on the surface of the above-mentioned lens. The IR-cut filter 570 may also be made of other materials.

Refer to Table 9 and Table 10 below.

TABLE 9

Fifth embodiment
f (focal length) = 1.38 mm (millimeters), Fno (f-number) = 2.07, FOV (field of view) = 140.09 deg (degree).

| Surface | | Curvature radius (mm) | Central thickness/ gap (mm) | Material | Refractive index (nd) | Abbe number (vd) | Focal length (mm) |
|---|---|---|---|---|---|---|---|
| 0 | Object | Infinity | Infinity | | | | |
| 1 | First lens | −4.455 (ASP) | 0.362 | Plastic | 1.54 | 56.00 | −2.81 |
| 2 | | 2.414 (ASP) | 1.562 | | | | |
| 3 | Stop | Infinity | 0.018 | | | | |
| 4 | Second lens | 3.208 (ASP) | 0.928 | Plastic | 1.54 | 55.60 | 2.21 |
| 5 | | −1.695 (ASP) | 0.036 | | | | |
| 6 | Third lens | 6.636 (ASP) | 0.273 | Plastic | 1.67 | 19.24 | −4.31 |
| 7 | | 1.994 (ASP) | 0.153 | | | | |
| 8 | Fourth lens | 2.686 (ASP) | 0.668 | Plastic | 1.54 | 56.00 | 9.55 |
| 9 | | 5.049 (ASP) | 0.033 | | | | |
| 10 | Fifth lens | 2.703 (ASP) | 0.709 | Plastic | 1.54 | 55.60 | 1.83 |
| 11 | | −1.404 (ASP) | 0.030 | | | | |
| 12 | Sixth lens | 1.567 (ASP) | 0.383 | Plastic | 1.66 | 20.40 | −2.73 |
| 13 | | 0.760 (ASP) | 0.422 | | | | |
| 14 | IR-cut filter | Infinity | 0.210 | Glass | 1.52 | 64.20 | |
| 15 | | Infinity | 0.500 | | | | |
| 16 | Image Plane | Infinity | — | | | | |

Reference wavelength 555 nm

TABLE 10

Aspheric coefficient

| Surface | 1 | 2 | 4 | 5 | 6 | 7 |
|---|---|---|---|---|---|---|
| K: | 1.8033E+00 | −1.8506E+01 | −4.1212E−01 | −8.1728E−01 | −5.1294E+01 | −6.8567E+00 |
| A2: | 0.0000E+00 | 0.0000E+00 | 0.0000E+00 | 0.0000E+00 | 0.0000E+00 | 0.0000E+00 |
| A4: | 2.5728E−01 | 4.4084E−01 | −1.2470E−02 | −2.7427E−01 | −3.1013E−01 | −1.3569E−01 |
| A6: | −1.5367E−01 | −1.3342E−01 | −2.2175E+00 | 1.2324E+00 | 1.0516E+00 | 1.8853E−01 |
| A8: | 6.7529E−02 | 2.6709E−01 | 2.4367E+01 | −7.2488E+00 | 1.0934E+01 | −2.6678E−01 |
| A10: | −1.9822E−02 | −6.9601E−01 | −1.4686E+02 | 2.0455E+01 | 1.0934E+01 | 2.5485E−01 |
| A12: | 3.5707E−03 | 8.9619E−01 | 4.7894E+02 | −3.0659E+01 | −1.4120E+01 | −1.3150E−01 |
| A14: | −3.5704E−04 | −5.2074E−01 | −8.2023E+02 | 2.2976E+01 | 9.3269E+00 | 2.8270E−02 |
| A16: | 1.5140E−05 | 1.0811E−01 | 5.7891E+02 | −6.8683E+00 | −2.4770E+00 | −2.1383E−03 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | −1.7099E+01 | 6.4947E+00 | −9.0586E+00 | −5.2435E−01 | −1.4750E+01 | −4.4180E+00 |
| A2: | 0.0000E+00 | 0.0000E+00 | 0.0000E+00 | 0.0000E+00 | 0.0000E+00 | 0.0000E+00 |
| A4: | 5.6351E−02 | −8.9800E−02 | 2.0941E−02 | 1.1868E−01 | −2.4676E−01 | −1.4722E−01 |
| A6: | −2.4594E−01 | −1.5097E−01 | −1.7106E−01 | 1.3721E−01 | 5.5292E−02 | 7.0678E−02 |
| A8: | 6.2960E−01 | −4.6884E−01 | −2.7705E−01 | −3.0645E−01 | −7.4005E−03 | −2.7183E−02 |
| A10: | −8.2702E−01 | 1.5001E+00 | 8.1279E−01 | 2.1310E−01 | −1.7512E−03 | 5.6193E−03 |
| A12: | 5.5903E−01 | −1.5046E+00 | −7.1026E−01 | −4.8598E−02 | −1.0156E−02 | −3.6748E−04 |
| A14: | −1.8485E−01 | 6.6025E−01 | 2.7388E−01 | −6.9098E−03 | 9.9466E−03 | −3.5930E−05 |
| A16: | 2.3527E−02 | −1.0813E−01 | −4.0508E−02 | 3.2529E−03 | −2.1848E−03 | 3.2433E−06 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In the Fifth embodiment, an aspheric curve equation is expressed as that in the first embodiment. In addition, definitions of parameters in the following tables are the same as those in the first embodiment, and are not repeated herein.

Referring to Table 9 and Table 10, the following data may be calculated:

| Fifth embodiment | | | |
|---|---|---|---|
| CRA/CA62 | 14.09 | EPD* CA11/CA22 | 1.56 |
| TDP2*HFOV/Fno | 30.69 | CA11/(CT1*TDP2) | 6.39 |
| f/R10 | −0.98 | R11*CA62/CT6 | 7.83 |
| f3/f5 | −2.35 | TL/ET1S | 9.58 |
| TL/IMH | 2.77 | f*CTSI/IMH | 2.66 |
| (f2/CT2) − (f5/CT5) | −0.20 | R4/CT2 | −1.83 |
| CRA/(TL − BFL) | 5.23 | TL/f | 4.55 |
| HFOV*(CA11/IMH) | 64.65 | | |

Sixth Embodiment

Figure 6A:
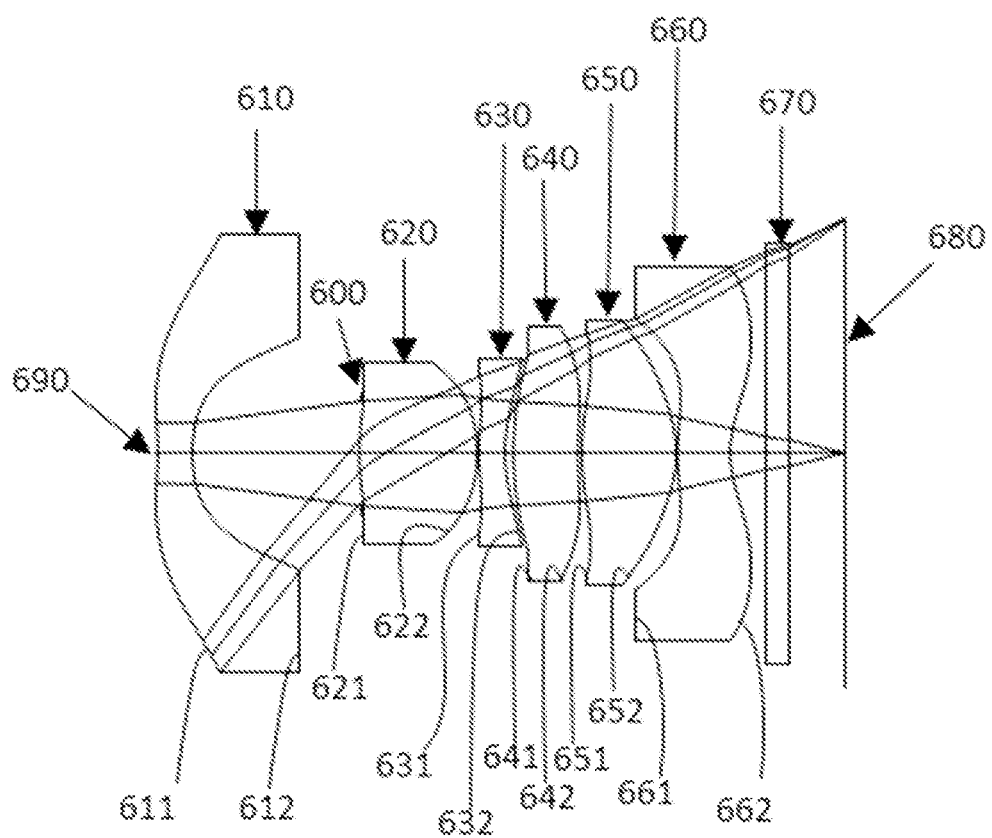
FIG. 6A is a schematic view of an optical lens assembly according to a sixth embodiment of the present disclosure of the present disclosure.
Figure 6B:
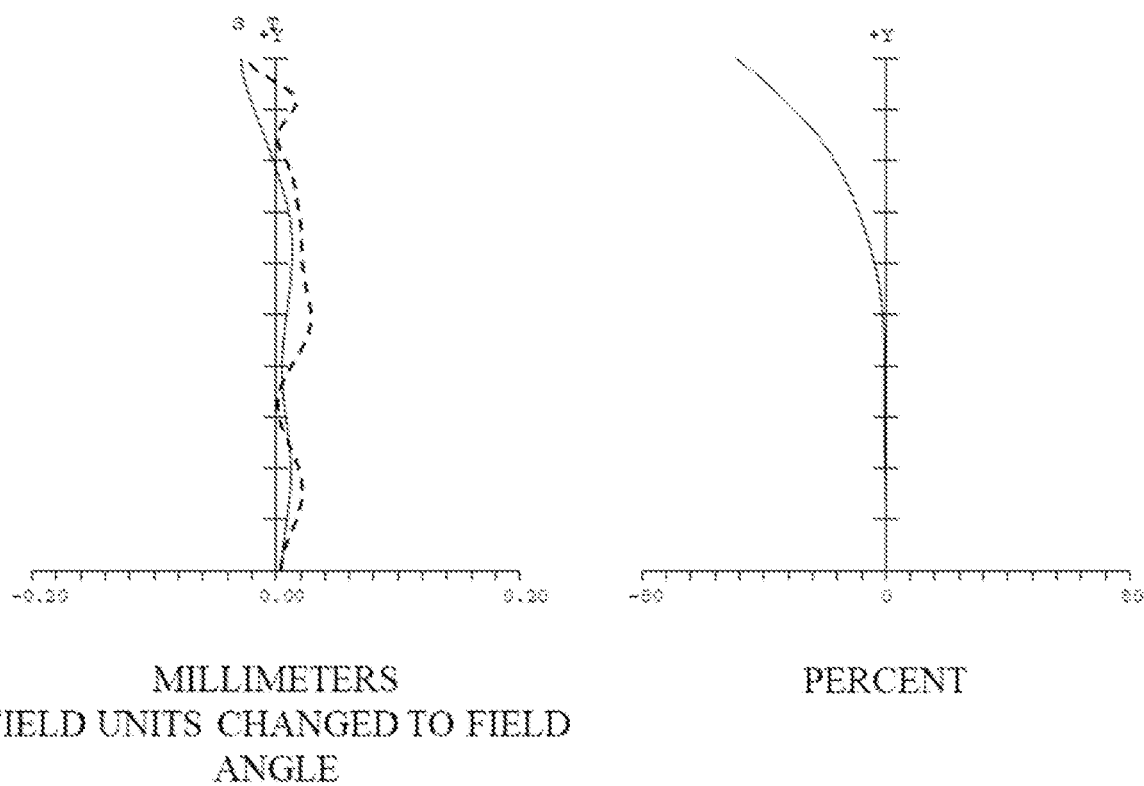
FIG. 6B shows a field curvature curves and a distortion curve of the optical lens assembly according to the sixth embodiment.

Refer to FIG. 6A and FIG. 6B. FIG. 6A is a schematic view of an optical lens assembly according to a sixth embodiment of the present disclosure, and FIG. 6B shows a field curvature curve and a distortion curve of an optical lens assembly according to a second embodiment. As can be seen from FIG. 6A, the optical lens assembly includes, in order from an object side to an image side: a stop 600, a first lens 610, a second lens 620, a third lens 630, a fourth lens 640, a fifth lens 650, a sixth lens 660, an TR-cut filter 670, and an image plane 680. A total quantity of lenses with refractive power in the optical lens assembly is six, but not limited thereto.

The first lens 610 with negative refractive power is made of a plastic material and includes an object-side surface 611 and an image-side surface 612, wherein the object-side surface 611 of the first lens 610 is concave near an optical axis 690, and the image-side surface 612 of the first lens 610 is concave near the optical axis 690. The object-side surface 611 and the image-side surface 612 are aspheric.

The second lens 620 with positive refractive power is made of a plastic material and includes an object-side surface 621 and an image-side surface 622, wherein the object-side surface 621 of the second lens 620 is convex near the optical axis 690, and the image-side surface 622 of the second lens 620 is convex near the optical axis 690. The object-side surface 621 and the image-side surface 622 are aspheric.

The third lens 630 with negative refractive power is made of a plastic material and includes an object-side surface 631 and an image-side surface 632, wherein the object-side surface 631 of the third lens 630 is convex near an optical axis 690, and the image-side surface 632 of the third lens 630 is concave near the optical axis 690. The object-side surface 631 and the image-side surface 632 are aspheric.

The fourth lens 640 with positive refractive power is made of a plastic material and includes an object-side surface 641 and an image-side surface 642, wherein the object-side surface 641 of the fourth lens 640 is convex near an optical axis 690, and the image-side surface 642 of the fourth lens 640 is concave near the optical axis 690. The object-side surface 641 and the image-side surface 642 are aspheric.

The fifth lens 650 with positive refractive power is made of a plastic material and includes an object-side surface 651 and an image-side surface 652, wherein the object-side surface 651 of the fifth lens 650 is convex near the optical axis 690, and the image-side surface 652 of the fifth lens 650 is convex near the optical axis 690. The object-side surface 651 and the image-side surface 652 are aspheric.

The sixth lens 660 with negative refractive power is made of a plastic material and includes an object-side surface 661 and an image-side surface 662, wherein the object-side surface 661 of the sixth lens 660 is convex near the optical axis 690, and the image-side surface 662 of the sixth lens 660 is concave near the optical axis 690. The object-side surface 661 and the image-side surface 662 are aspheric.

The TR-cut filter 670 is made of glass, and is disposed between the sixth lens 660 and the image plane 680 without affecting a focal length of the optical lens assembly. It can be understood that, the TR-cut filter 670 may also be formed on the surface of the above-mentioned lens. The TR-cut filter 670 may also be made of other materials.

Refer to Table 11 and Table 12 below.

TABLE 11

Sixth embodiment
f (focal length) = 1.19 mm (millimeters), Fno (f-number) = 2.06, FOV (field of view) = 150.07 deg (degree).

| Surface | | Curvature radius (mm) | Central thickness/ gap (mm) | Material | Refractive index (nd) | Abbe number (vd) | Focal length (mm) |
|---|---|---|---|---|---|---|---|
| 0 | Object | Infinity | Infinity | | | | |
| 1 | First lens | −4.284 (ASP) | 0.317 | Plastic | 1.54 | 56.00 | −2.20 |
| 2 | | 1.707 (ASP) | 1.507 | | | | |
| 3 | Stop | Infinity | −0.005 | | | | |
| 4 | Second lens | 3.397 (ASP) | 1.046 | Plastic | 1.54 | 56.00 | 2.08 |
| 5 | | −1.516 (ASP) | 0.030 | | | | |
| 6 | Third lens | 2.888 (ASP) | 0.220 | Plastic | 1.67 | 19.24 | −4.92 |
| 7 | | 1.499 (ASP) | 0.088 | | | | |
| 8 | Fourth lens | 3.055 (ASP) | 0.580 | Plastic | 1.54 | 56.00 | 14.39 |
| 9 | | 4.665 (ASP) | 0.031 | | | | |
| 10 | Fifth lens | 3.028 (ASP) | 0.835 | Plastic | 1.54 | 56.00 | 1.76 |
| 11 | | −1.267 (ASP) | 0.031 | | | | |
| 12 | Sixth lens | 2.402 (ASP) | 0.460 | Plastic | 1.66 | 20.37 | −2.83 |
| 13 | | 0.976 (ASP) | 0.322 | | | | |
| 14 | IR-cut filter | Infinity | 0.210 | Glass | 1.52 | 64.20 | |
| 15 | | Infinity | 0.500 | | | | |
| 16 | Image Plane | Infinity | — | | | | |

Reference wavelength 555 nm

TABLE 12

Aspheric coefficient

| Surface | 1 | 2 | 4 | 5 | 6 | 7 |
|---|---|---|---|---|---|---|
| K: | 1.7754E+00 | −2.3269E+01 | 1.9906E+00 | −1.4938E+00 | −3.3347E+01 | −4.9396E+00 |
| A2: | 0.0000E+00 | 0.0000E+00 | 0.0000E+00 | 0.0000E+00 | 0.0000E+00 | 0.0000E+00 |
| A4: | 3.1469E−01 | 9.0876E−01 | −3.4548E−02 | −3.1807E−01 | −1.1607E−01 | −5.3283E−02 |
| A6: | −2.2131E−01 | −1.6471E+00 | −2.4236E+00 | −6.9436E−02 | −9.8370E−01 | −2.4467E−01 |
| A8: | 1.0511E−01 | 4.8027E+00 | 3.6713E+01 | 1.1157E+00 | −3.6373E+00 | 5.5414E−01 |
| A10: | −3.1821E−02 | −9.3166E+00 | −3.2539E+02 | −8.4406E−01 | −3.6373E+00 | −3.9457E−01 |
| A12: | 5.8609E−03 | 1.0300E+01 | 1.6145E+03 | −3.4672E+00 | 2.1173E+00 | −1.5754E−02 |
| A14: | −6.0185E−04 | −5.7726E+00 | −4.2014E+03 | 5.9190E+00 | −7.7600E−01 | 1.1956E−01 |
| A16: | 2.6579E−05 | 1.2576E+00 | 4.4274E+03 | −2.7379E+00 | 2.5350E−01 | −3.6379E−02 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | −2.9959E+01 | 8.7379E+00 | −8.4936E−01 | −5.1717E−01 | −4.6205E+01 | −6.8787E+00 |
| A2: | 0.0000E+00 | 0.0000E+00 | 0.0000E+00 | 0.0000E+00 | 0.0000E+00 | 0.0000E+00 |
| A4: | −1.5090E−01 | −1.4556E−01 | 1.0910E−01 | 1.1652E−01 | −2.0151E−01 | −2.7547E−02 |
| A6: | 7.8940E−01 | −3.2416E−02 | −3.7805E−01 | 3.3907E−01 | 1.3052E−01 | −1.9175E−01 |
| A8: | −1.5046E+00 | −1.2493E+00 | −1.5284E−01 | −7.2153E−01 | −6.9751E−01 | 2.2386E−01 |
| A10: | 1.6405E+00 | 3.3923E+00 | 8.0815E−01 | 5.5280E−01 | 1.2255E+00 | −1.2004E−01 |
| A12: | −1.0863E+00 | −3.4791E+00 | −6.7548E−01 | −1.8067E−01 | −9.7802E−01 | 3.4543E−02 |
| A14: | 4.0586E−01 | 1.6053E+00 | 2.1733E−01 | 1.7209E−02 | 3.7283E−01 | −5.1782E−03 |
| A16: | −6.5487E−02 | −2.7937E−01 | −2.2744E−02 | 1.7526E−03 | −5.5277E−02 | 3.1741E−04 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In the sixth embodiment, an aspheric curve equation is expressed as that in the first embodiment. In addition, definitions of parameters in the following tables are the same as those in the first embodiment, and are not repeated herein.

Referring to Table 11 and Table 12, the following data may be calculated:

| Sixth embodiment | | | |
|---|---|---|---|
| CRA/CA62 | 16.68 | EPD* CA11/CA22 | 1.40 |
| TDP2*HFOV/Fno | 34.75 | CA11/(CT1*TDP2) | 6.98 |
| f/R10 | −0.94 | R11*CA62/CT6 | 9.41 |
| f3/f5 | −2.80 | TL/ET1S | 11.17 |
| TL/IMH | 2.72 | f*CTSI/IMH | 2.28 |
| (f2/CT2) − (f5/CT5) | −0.12 | R4/CT2 | −1.45 |
| CRA/(TL − BFL) | 5.86 | TL/f | 5.19 |
| HFOV*(CA11/IMH) | 69.75 | | |

Seventh Embodiment

Figure 7:
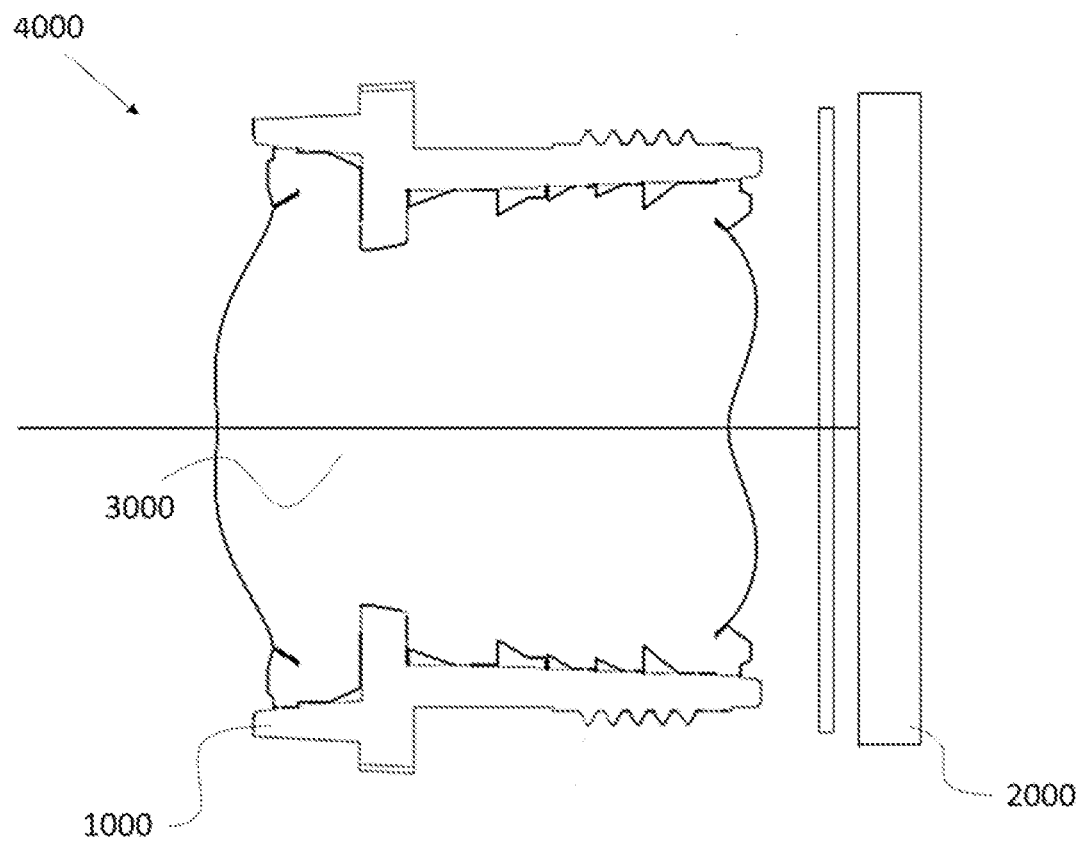
FIG. 7 is a schematic view of a photographing module according to a seventh embodiment of the present disclosure.

Refer to FIG. 7. FIG. 7 is a schematic view of a photographing module 4000 according to an eighth embodiment of the present disclosure. The photographing module includes a lens barrel 1000, an optical lens assembly 3000, and an image sensor 2000. The optical lens assembly 3000 can be the optical lens assemblies according to the above-mentioned embodiments, and the optical lens assembly 3000 is disposed in the lens barrel 1000. The image sensor 2000 is disposed on an image plane of the optical lens assembly 3000, and is an electronic photosensitive element (e.g., CMOS, CCD) with good sensitivity and low noise, so as to truly present the image quality of the optical lens assembly.

In the foregoing embodiments, those with ordinary knowledge in the art should understand that, in the optical lens assembly and the photographing module provided in the present disclosure, the lens may be made of glass or plastic. The lens made of glass can increase the degree of freedom of the configuration of the refractive power of the optical lens assembly. The lens made of glass may be made by using related technologies such as grinding, molding, or the like. The lens made of plastic can reduce the production costs.

In the optical lens assembly provided in the present disclosure, for the lens with refractive power, if the surface of the lens is convex and a position of the convex surface is not defined, it indicates that the surface of the lens is convex near the optical axis. If the surface of the lens is concave and a position of the concave surface is not defined, it indicates that the surface of the lens is concave near the optical axis.

The optical lens assembly provided in the present disclosure can be applicable to an optical system having an ultra wide angle, high image quality and miniaturization according to the requirements, and can be used in electronic imaging systems of the Internet of Things (IOT) devices in many ways, but not limited thereto.

What is claimed is:

1. An optical lens assembly comprising a stop, and in order from an object side to an image side, comprising:
    a first lens with negative refractive power, comprising an object-side surface and an image-side surface, wherein the image-side surface of the first lens is concave near the optical axis;
    a second lens with positive refractive power, comprising an object-side surface and an image-side surface, wherein the object-side surface of the second lens is convex near the optical axis, and the image-side surface of the second lens is convex near the optical axis;
    a third lens with negative refractive power, comprising an object-side surface and an image-side surface, wherein the image-side surface of the third lens is concave near the optical axis;
    a fourth lens with positive refractive power, comprising an object-side surface and an image-side surface, wherein the object-side surface of the fourth lens is convex near the optical axis, and the image-side surface of the fourth lens is concave near the optical axis;
    a fifth lens with positive refractive power, comprising an object-side surface and an image-side surface, wherein the object-side surface of the fifth lens is convex near the optical axis, and the image-side surface of the fifth lens is convex near the optical axis; and
    a sixth lens with positive refractive power, comprising an object-side surface and an image-side surface, wherein the object-side surface of the sixth lens is convex near the optical axis, and the image-side surface of the sixth lens is concave near the optical axis;
    wherein an incident angle where a main light is incident on an image plane at a maximum view angle of the optical lens assembly is CRA, a maximum optical effective radius of the image-side surface of the sixth lens is CA62, and the following conditions are satisfied: $9.27 < CRA/CA62 < 20.02$.

2. The optical lens assembly according to claim 1, wherein a displacement parallel to the optical axis from an intersection point of the image-side surface of the first lens on the optical axis to a position of the maximum effective radius of the image-side surface of the first lens is TDP2, a half of a maximum field of view of the optical lens assembly is HFOV, an f-number of the optical lens assembly is Fno, and the following conditions are satisfied: $12.19$ (mm*degree) $< TDP2*HFOV/Fno < 41.70$ (mm*degree).

3. The optical lens assembly according to claim 1, wherein a focal length of the optical lens assembly is f, a curvature radius of an image-side surface of the fifth lens is R10, and the following condition is satisfied: $-1.6 < f/R10 < -0.6$.

4. The optical lens assembly according to claim 1, wherein a focal length of the third lens is f3, a focal length of the fifth lens is f5, and the following condition is satisfied: $-4.01 < f3/f5 < -1.09$.

5. The optical lens assembly according to claim 1, wherein a distance from the object-side surface of the first lens to the image plane along the optical axis is TL, a maximum image height of the optical lens assembly is INM, and the following condition is satisfied: $1.95 < TL/IMH < 3.32$.

6. The optical lens assembly according to claim 1, wherein a focal length of the second lens is f2, a focal length of the fifth lens is f5, a central thickness of the second lens along the optical axis is CT2, a central thickness of the fifth lens along the optical axis is CT5, and the following condition is satisfied: $-3.13 < (f2/CT2) - (f5/CT5) < 0.5$.

7. The optical lens assembly according to claim 1, wherein a distance from the object-side surface of the first lens to the image plane along the optical axis is TL, a distance from the image-side surface of the sixth lens to the image plane along the optical axis is BFL, and the following conditions are satisfied: $3.35$ (degree/mm) $< CRA/(TL-BFL) < 7.03$ (degree/mm).

8. The optical lens assembly according to claim 1, wherein a half of a maximum field of view of the optical lens assembly is HFOV, a maximum optical effective radius of the object-side surface of the first lens is CA11, a maximum image height of the optical lens assembly is IMH, and the following conditions are satisfied: $31.70$ (degree) $< HFOV*(CA11/IMH) < 83.70$ (degree).

9. The optical lens assembly according to claim 1, wherein an entrance pupil diameter of the optical lens assembly is EPD, a maximum optical effective radius of the object-side surface of the first lens is CA11, a maximum optical effective radius of the image-side surface of the second lens is CA22, and the following conditions are satisfied: $1.12$ (mm) $< EPD*CA11/CA22 < 3.12$ (mm).

10. The optical lens assembly according to claim 1, wherein a maximum optical effective radius of the object-side surface of the first lens is CA11, a central thickness of the first lens along the optical axis is CT1, a displacement parallel to the optical axis from an intersection point of the image-side surface of the first lens on the optical axis to a position of the maximum effective radius of the image-side surface of the first lens is TDP2, and the following conditions are satisfied: $3.49$ (mm$^{-1}$) $< CA11/(CT1*TDP2) < 8.87$ (mm$^{-1}$).

11. The optical lens assembly according to claim 1, wherein a curvature radius of the object-side surface of the sixth lens is R11, a central thickness of the sixth lens along the optical axis is CT6, and the following conditions are satisfied: 6.27 (mm)<R11*CA62/CT6<28.92 (mm).

12. The optical lens assembly according to claim 1, wherein a distance from the object-side surface of the first lens to the image plane along the optical axis is TL, a distance between the position of the maximum optical effective radius of the image-side surface of the first lens and the stop along the optical axis is ET1S, and the following conditions are satisfied: 4.82<TL/ET1S<13.40.

13. The optical lens assembly according to claim 1, wherein a focal length of the optical lens assembly is f, a distance between the stop and the image plane along the optical axis is CTSI, a maximum image height of the optical lens assembly is IMH, and the following conditions are satisfied: 1.82 (mm)<f*CTSI/IMH<6.13 (mm).

14. The optical lens assembly according to claim 1, wherein a curvature radius of the image-side surface of the second lens is R4, a central thickness of the second lens along the optical axis is CT2, and the following conditions are satisfied: −3.79<R4/CT2<−1.16.

15. A photographing module, comprising:
a lens barrel;
an optical lens assembly disposed in the lens barrel; and
an image sensor disposed on an image plane of the optical lens assembly,
wherein the optical lens assembly comprises a stop, and in order from an object side to an image side, comprises:
a first lens with negative refractive power, comprising an object-side surface and an image-side surface, wherein the image-side surface of the first lens is concave near the optical axis;
a second lens with positive refractive power, comprising an object-side surface and an image-side surface, wherein the object-side surface of the second lens is convex near the optical axis, and the image-side surface of the second lens is convex near the optical axis;
a third lens with negative refractive power, comprising an object-side surface and an image-side surface, wherein the image-side surface of the third lens is concave near the optical axis;
a fourth lens with positive refractive power, comprising an object-side surface and an image-side surface, wherein the object-side surface of the fourth lens is convex near the optical axis, and the image-side surface of the fourth lens is concave near the optical axis; and
a fifth lens with positive refractive power, comprising an object-side surface and an image-side surface, wherein the object-side surface of the fifth lens is convex near the optical axis, and the image-side surface of the fifth lens is convex near the optical axis;
a sixth lens with positive refractive power, comprising an object-side surface and an image-side surface, wherein the object-side surface of the sixth lens is convex near the optical axis, and the image-side surface of the sixth lens is concave near the optical axis;
wherein an incident angle where a main light is incident on an image plane at a maximum view angle of the optical lens assembly is CRA, a maximum optical effective radius of the image-side surface of the sixth lens is CA62, and the following conditions are satisfied: 9.27<CRA/CA62<20.02.

16. The photographing module according to claim 15, wherein a displacement parallel to the optical axis from an intersection point of the image-side surface of the first lens on the optical axis to a position of the maximum effective radius of the image-side surface of the first lens is TDP2, a half of a maximum field of view of the optical lens assembly is HFOV, an f-number of the optical lens assembly is Fno, and the following conditions are satisfied: 12.19 (mm*degree)<TDP2*HFOV/Fno<41.70 (mm*degree).

17. The photographing module according to claim 15, wherein an incident angle where a main light is incident on an image plane at a maximum view angle of the optical lens assembly is CRA, a distance from the object-side surface of the first lens to the image plane along the optical axis is TL, a distance from the image-side surface of the sixth lens to the image plane along the optical axis is BFL, and the following conditions are satisfied: 3.35 (degree/mm)<CRA/(TL−BFL) <7.03 (degree/mm).

18. The photographing module according to claim 15, wherein a half of a maximum field of view of the optical lens assembly is HFOV, a maximum optical effective radius of the object-side surface of the first lens is CA11, a maximum image height of the optical lens assembly is IMH, and the following conditions are satisfied: 31.70 (degree)<HFOV* (CA11/IMH)<83.70 (degree).

19. The photographing module according to claim 15, wherein an entrance pupil diameter of the optical lens assembly is EPD, a maximum optical effective radius of the object-side surface of the first lens is CA11, a maximum optical effective radius of the image-side surface of the second lens is CA22, and the following conditions are satisfied: 1.12 (mm)<EPD*CA11/CA22<3.12 (mm).

20. The photographing module according to claim 15, wherein a a maximum optical effective radius of the object-side surface of the first lens is CA11, a central thickness of the first lens along the optical axis is CT1, a displacement parallel to the optical axis from an intersection point of the image-side surface of the first lens on the optical axis to a position of the maximum effective radius of the image-side surface of the first lens is TDP2, and the following conditions are satisfied: 3.49 (mm$^{-1}$)<CA11/(CT1*TDP2)<8.87 (mm$^{-1}$).

* * * * *